United States Patent
Bukurak et al.

(10) Patent No.: US 9,824,126 B2
(45) Date of Patent: Nov. 21, 2017

(54) METHODS AND APPARATUS FOR A COMPREHENSIVE SEARCHING ON A MOBILE DEVICE

(75) Inventors: David Bukurak, Ontario (CA); Jennifer Ignacz, Malmö (SE)

(73) Assignee: BLACKBERRY LIMITED, Waterloo, Ontario (CA)

( * ) Notice: Subject to any disclaimer, the term of this patent is extended or adjusted under 35 U.S.C. 154(b) by 1198 days.

(21) Appl. No.: 13/578,981

(22) PCT Filed: Feb. 15, 2011

(86) PCT No.: PCT/CA2011/050093
§ 371 (c)(1),
(2), (4) Date: Oct. 25, 2012

(87) PCT Pub. No.: WO2011/097740
PCT Pub. Date: Aug. 18, 2011

(65) Prior Publication Data
US 2013/0218870 A1 Aug. 22, 2013

Related U.S. Application Data

(60) Provisional application No. 61/304,665, filed on Feb. 15, 2010, provisional application No. 61/327,578, filed on Apr. 23, 2010.

(51) Int. Cl.
*G06F 17/30* (2006.01)
*H04M 1/725* (2006.01)

(52) U.S. Cl.
CPC .. *G06F 17/30554* (2013.01); *G06F 17/30864* (2013.01); *H04M 1/72522* (2013.01); *H04M 1/72561* (2013.01)

(58) Field of Classification Search
CPC ......... G06F 17/30477; G06F 17/30554; G06F 17/30864; G06F 17/30899; G06F 17/30516; G06F 17/30551; G06F 17/30964
See application file for complete search history.

(56) References Cited

U.S. PATENT DOCUMENTS

2004/0172385 A1* 9/2004 Dayal ............... G06F 17/30501
707/999.003
2004/0268315 A1* 12/2004 Gouriou ................ G06F 11/362
717/129

(Continued)

OTHER PUBLICATIONS

PCT International Search Report and Written Opinion relating to application No. PCT/CA2011/050093 dated May 18, 2011.

(Continued)

*Primary Examiner* — Ashish K Thomas
*Assistant Examiner* — Rezwanul Mahmood
(74) *Attorney, Agent, or Firm* — Rowand LLP

(57) ABSTRACT

A mobile wireless communications device includes a display, and a memory configured to store a plurality of applications and corresponding application data for each application. The mobile wireless communications device also includes at least one input device, and a processor. The processor is configured to search the application data for a search term to thereby determine whether each application of the plurality thereof has search results associated therewith, and present applications having search results associated therewith on an application selection screen, without displaying the search results, on the display. The processor is further configured to receive selection of an application of the plurality thereof via the at least one input device, and execute the selected application to thereby present the search results on the display.

16 Claims, 43 Drawing Sheets

(56) References Cited

U.S. PATENT DOCUMENTS

| | | | | |
|---|---|---|---|---|
| 2005/0097089 | A1* | 5/2005 | Nielsen | G06F 17/30967 707/999.003 |
| 2006/0047644 | A1* | 3/2006 | Bocking et al. | 707/4 |
| 2007/0255831 | A1* | 11/2007 | Hayashi | G06F 17/30867 709/226 |
| 2008/0184370 | A1* | 7/2008 | Ouchi | G06F 21/56 726/24 |
| 2008/0319975 | A1* | 12/2008 | Morris | G06F 3/048 707/999.005 |
| 2008/0320389 | A1 | 12/2008 | Tanaka et al. | |
| 2009/0157621 | A1* | 6/2009 | Ujiie | G06F 17/30457 707/999.003 |
| 2009/0240672 | A1 | 9/2009 | Costello | |
| 2010/0145967 | A1* | 6/2010 | Fu | G06F 17/30905 707/758 |
| 2010/0169841 | A1* | 7/2010 | Singh | G06F 17/30967 715/863 |
| 2010/0306191 | A1* | 12/2010 | LeBeau et al. | 707/723 |
| 2011/0313999 | A1* | 12/2011 | Bruno | G06F 17/30463 707/718 |
| 2012/0054175 | A1* | 3/2012 | Barsness | G06F 17/30477 707/719 |
| 2012/0054514 | A1* | 3/2012 | Barsness | G06F 1/329 707/769 |

OTHER PUBLICATIONS

PCT International Preliminary Report on Patentability, relating to application No. PCT/CA2011/050093 dated Jun. 26, 2012.
Cheng, J: "Hands on review: iPhone OS 3.0 chock full of changes", Ars Technica 2009 Conde Nast Digital, Jun. 17, 2009, pp. 1-5, URL:<http://replay.web.archive.org/20090619184311/http://arstechnica.com/apple/reviews/2009/06/hands-on-review-iphone-os-30-chock-full-of-changes.ars> retrieved from the Internet May 10, 2011.
Eaton, K., Palm Pre vs iPhone 3.0: A Feature-by-Feature Comparison, www.fastcompany.com, Mar. 17, 2009, http://www.fastcompany.com/1218515/palm-pre-vs-iphone-30-feature-feature-comparison, retrieved Sep. 3, 2010.
Zibreg, C. Android 2.0: Five reasons why it's huge, www.geek.com, Oct. 30, 2009, pp. 1-14, http://www.geek.com/articles/mobile/android-2-0-five-reasons-why-its-huge-20091030/, retrieved Nov. 1, 2009.
Park, W., Palm Pre hands-on video—Live from the Palm Lounge @ CRS Las Vegas 2009!, www.intomobile.com, Jan. 9, 2009, pp. 1-7, http://www.intomobile.com/2009/01/09/palm-pre-hands-on-video-live-from-the-palm-lounge-ces-las-vegas-2009/, retrieved Dec. 17, 2010.
Captain, S., Palm Pre Review: Don't Call it an iPhone Killer, www.ubergizmo.com, Jun. 5, 2009, pp. 1-18, http://www.ubergizmo.com/2009/06/palm-pre-review-dont-call-it-an-iphone-killer/, retrieved Feb. 15, 2011.
Apple.com, Search Across Your iPhone with Spotlight, or Search Contacts, Mail, Calendar, and Notes, pp. 1-2, http://web.archive.org/web/20100112143223/http://www.apple.com/iphone/iphone-3gs/search.html, retrieved Jan. 12, 2010.
Lebeau, M., and Rosaen, K. Quick Search Box, Android Developers, Sep. 17, 2009, pp. 1-3, http://android-developers.blogspot.ca/2009/09/introducing-quick-search-box-for.html, retrieved Sep. 3, 2010.
Cutler, K., Android's, search gets a lot richer than the iPhone's, DigitialBeat, Oct. 9, 2009, pp. 1-7, http://venturebeat.com/2009/10/09/androids-search-gets-a-lot-richer-than-the-iphones/, retrieved Oct. 18, 2012.
EPO, Extended European Search Report relating to EP Application No. 11741808.7, dated May 3, 2016.
Anonymous: "Basic Searching with Spotlight in Mac OS X", dated Jul. 15, 2009, XP055267761.
Anonymous: "Groowe Search Toolbar", dated Jul. 21, 2006, XP055145453.

* cited by examiner

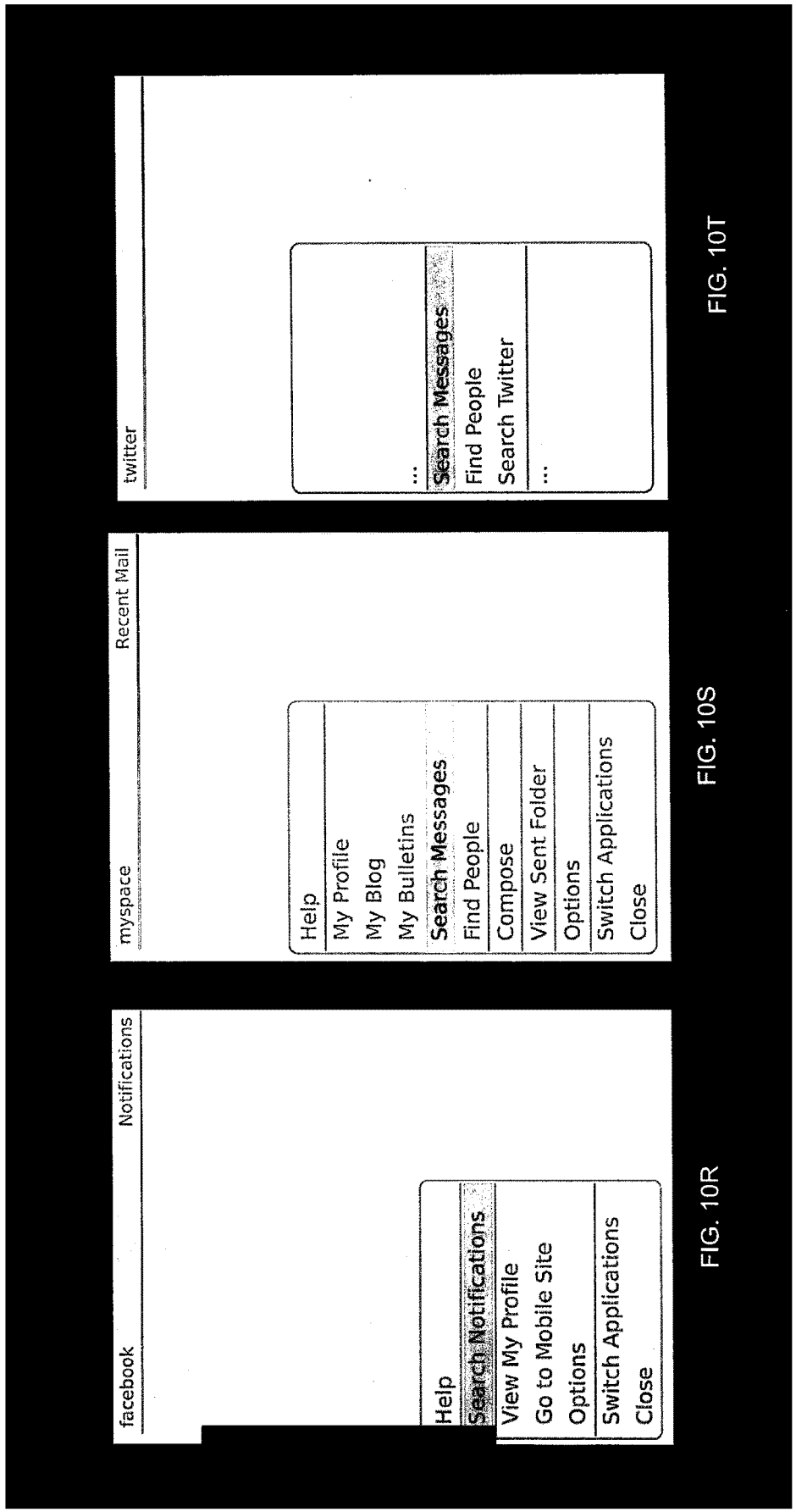

| 10:59AM | 3 ✉ | 3G 📶 |
|---|---|---|

Search Results (143)

col|

✉ Colin Davidson    1:12pm
    Re: Holiday Pictures
    Tues, Nov 23rd 2009

✉ Colin Davidson    11:18am
    Re: Holiday Pictures
    Mon, Nov 22nd 2009

✉ Colin Davidson    1:22pm
    Re: Squash Tue 7:45pm
    Sat, Nov 20th 2009

✉ Jennifer Celeb    1:22pm
    FW: Color choices for next year ▶
    Tue, Nov 16th 2009

✉ Colin Davidson    3:22pm
    Meeting at the school
    Tue, Nov 9th 2009

✉ Colton Chasey    1:22pm
    Tennis club closed

FIG. 11D

METHODS AND APPARATUS FOR A COMPREHENSIVE SEARCHING ON A MOBILE DEVICE

CROSS-REFERENCE TO RELATED APPLICATION

This application claims the benefit of and priority to claiming priority to U.S. Application Ser. No. 61/304,665 filed Feb. 15, 2010 and U.S. Provisional Application Ser. No. 61/327,578 filed Apr. 23, 2010.

The content of the above patent application is hereby expressly incorporated by reference into the detailed description hereof.

TECHNICAL FIELD

The present disclosure related to the field of mobile wireless communications devices, and, more particularly, to the execution of content searches by mobile wireless communications devices.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices also allow users to send and receive electronic mail (email) messages wirelessly and access the Internet via a cellular network and/or a wireless local area network (WLAN), for example. In addition, these devices may allow users to send Short Messaging Service (SMS) messages, Personal Identification Number (PIN) messages, and instant messages.

Given the amount of information now stored on a mobile device itself, and the amount of data remotely accessible by the mobile device, a user may wish to search for a specific e-mail, media file, or contact, for example. To facilitate this, some mobile devices include search functionality. They may allow a user to search for a specific contact, for e-mails from a given sender, or for songs by a certain performing artist.

This search functionality is typically associated a given application. For example, a user may open a list of his contacts, and search that list of contacts, or may open a list of his music files, and search that list of music files. While such functionality advantageously allows a user to locate data more quickly than without a search function, further improvements in how a mobile device searches, and presents the results of, both its own content and external content may be desirable.

BRIEF DESCRIPTION OF THE DRAWINGS

For a better understanding of the various embodiments described herein and to show more clearly how they may be carried into effect, reference will now be made, by way of example only, to the accompanying drawings which show example embodiment and in which.

DETAILED DESCRIPTION

Figure 1:
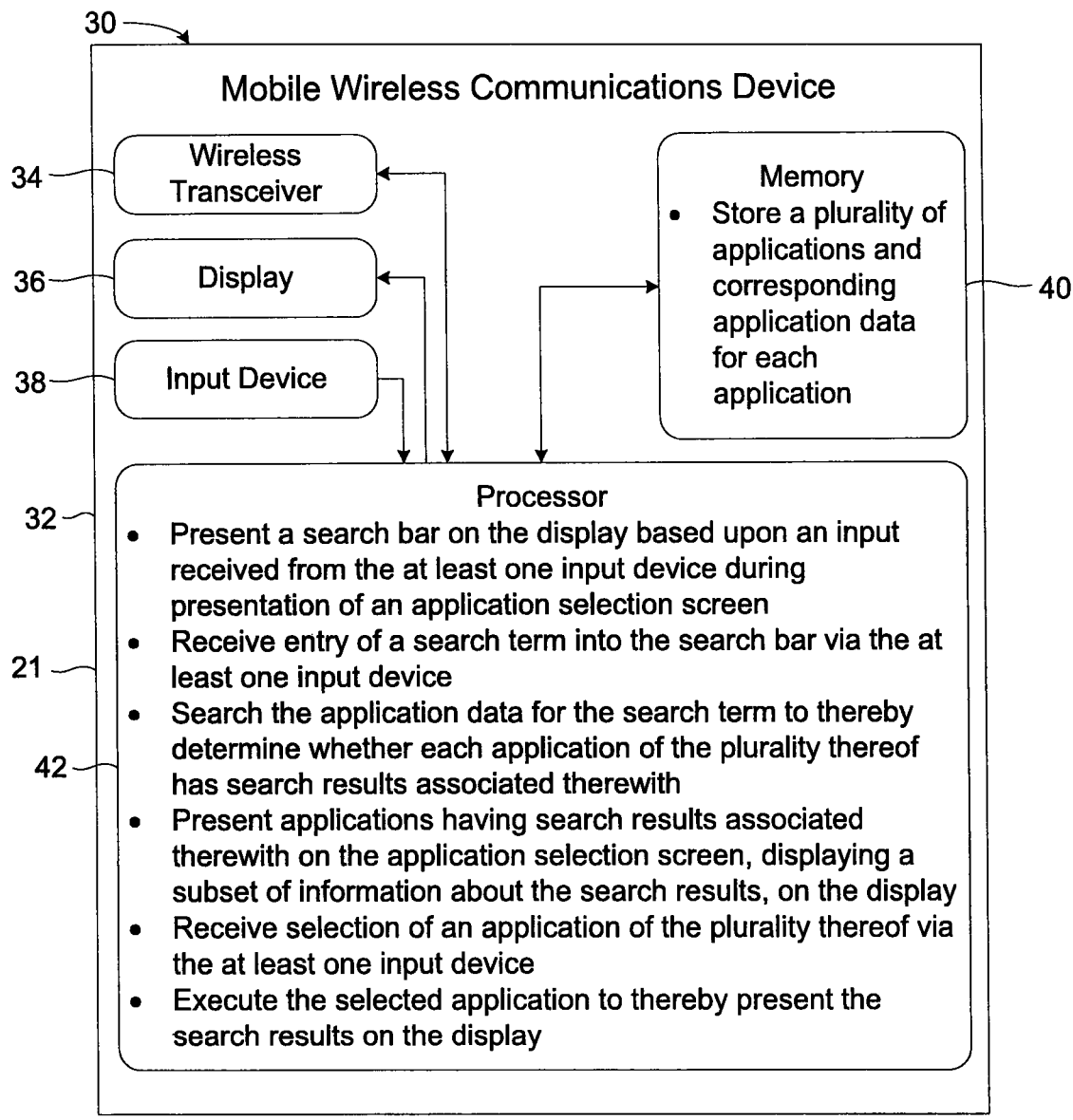
FIG. 1 is schematic block diagram of an example embodiment of a mobile wireless communications device in accordance with the present disclosure.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Generally speaking, a mobile wireless communications device (also referred to herein as a mobile device) may include a display, and a memory configured to store a plurality of applications and corresponding application data for each application. The mobile wireless communications device may also include at least one input device and a processor configured to search the application data for a search term to thereby determine whether each application of the plurality thereof has search results associated therewith. The processor may also be configured to present applications having search results associated therewith on an application selection screen, without displaying the search results, on the display, and receive selection of an application of the plurality thereof via the at least one input device.

The processor may be further configured to execute the selected application to thereby present the search results on the display.

The processor may be further configured to present a search bar on the display based upon an input received from the at least one input device during presentation of the application selection screen, and to receive entry of the search term into the search bar via the at least one input device. In addition, the processor may be configured to present the applications having search results associated therewith on the display by presenting respective icons representing the applications on the display, and by presenting an indication of a quantity of search results for each icon adjacent thereto. Furthermore, the processor may be configured to present the indication of the quantity of search results as a number.

In some instances, the application data may comprise application icons and labels associated therewith. The processor, when executing the application, may permit modification of the search term. Also, the processor may be configured to search the application data corresponding to the application for the modified search term to thereby generate modified search results. The processor, when executing the application, may be further configured to present the modified search results on the display.

The processor may also be configured to present a web search icon with the search results, and to search at least one associated web site for the search term based upon selection of the web search icon. The memory may be configured to store an Internet enabled application having application data associated therewith stored on an external server, and the processor may also be configured to present an icon for the Internet enabled application with the search results.

In some applications, the processor may be configured to search the external server for the search term via execution of the Internet enabled application, based upon selection of the icon for the Internet enabled application. The Internet enabled application may comprise a music streaming application or social networking application, for example.

A method aspect is directed to a method of searching application data using a mobile wireless communications device. The method may include storing a plurality of applications and corresponding application data for each application in a memory of the mobile wireless communication device, and searching the application data for a search term to thereby determine whether each application of the plurality thereof has search results associated therewith, using a processor of the mobile wireless communications device. The method may also include presenting applications having search results associated therewith on an application selection screen, without displaying the search results, on a display of the mobile wireless communications device, using the processor, and receiving selection of an application of the plurality thereof via at least one input device of the mobile wireless communications device, using the processor. The method may further include executing the selected application to thereby present the search results on the display, using the processor.

Referring now to FIG. 1, a mobile wireless communications device 30 is described. Example mobile wireless communications devices 30 may include portable or personal media players (e.g., music or MP3 players, video players, etc.), remote controls (e.g., television or stereo remotes, etc.), portable gaming devices, portable or mobile telephones, smartphones, tablet computers, etc.

The mobile wireless communications device 30 includes a housing 21 carrying a wireless transceiver 34, a display 36, an input device 38, a memory 40, and a processor 42. The wireless transceiver 34, display 36, input device, and memory 40 are coupled to the processor.

The wireless transceiver 34 may be a cellular transceiver, and may be configured to perform both voice and data cellular communications. The wireless transceiver 34 may also have other wireless communications capability, such as WiFi and Bluetooth.

The input device 38 may be a keyboard, touch sensitive pad, trackball, thumbwheel, button, microphone, or other suitable device, for example. It should be appreciated that in some applications, the display 36 may be a touch sensitive display, and may therefore serve as the input device 38.

Figure 8D:
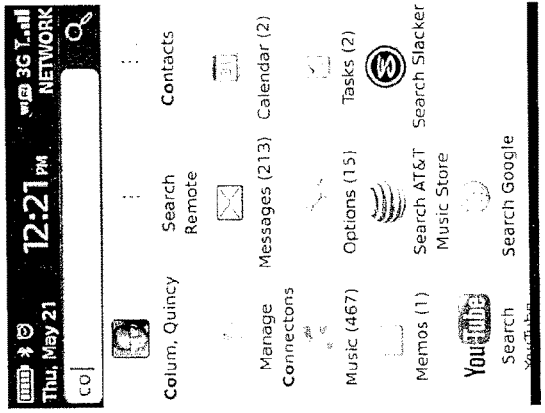
FIGS. 8A-8Z illustrate a mobile wireless communications device, such as those of FIGS. 1, 2, and 4, performing a comprehensive search, in accordance with the present disclosure.
Figure 8C:
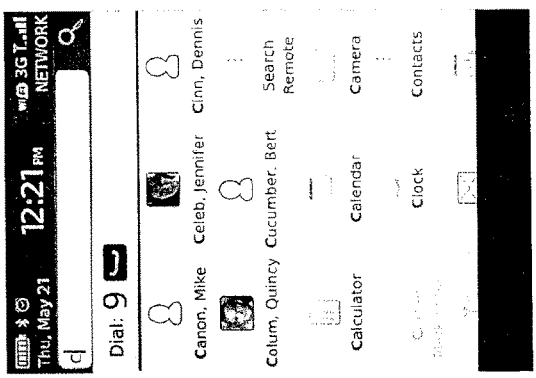
Figure 8B:
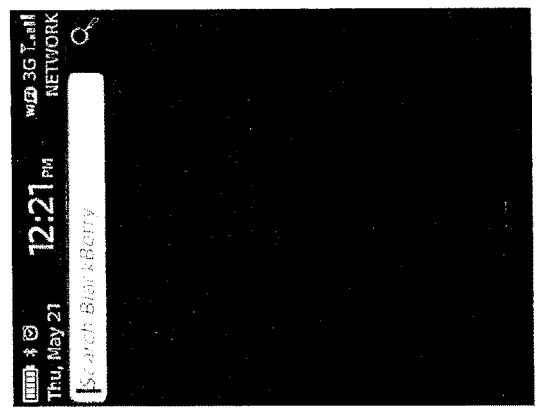
Figure 8A:
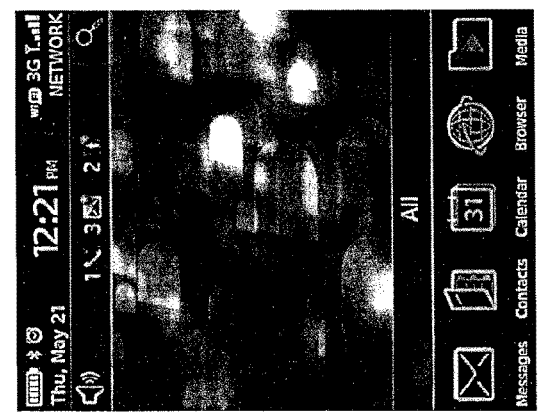

The memory 40 may include both volatile and non-volatile portions and is configured to store a plurality of applications and corresponding application data for each application. The applications may be any sort of applications, include a messaging application, a contacts application, a calendar application, a notes application, and a media player application, for example The processor 42 is configured to present a search bar on the display 36 based upon an input received from the at least one input device 38 during presentation of a main application selection screen or "home screen." This application selection screen presents icons representing at least some of the applications stored in the memory 40, along with labels associated with those applications. An example application selection screen is shown in FIG. 8A. An example search bar is shown in FIG. 8B. As shown, the application selection screen is displayed in FIG. 8A, and a key has been pressed, so the search bar is therefore displayed in FIG. 8B.

Figure 8F:
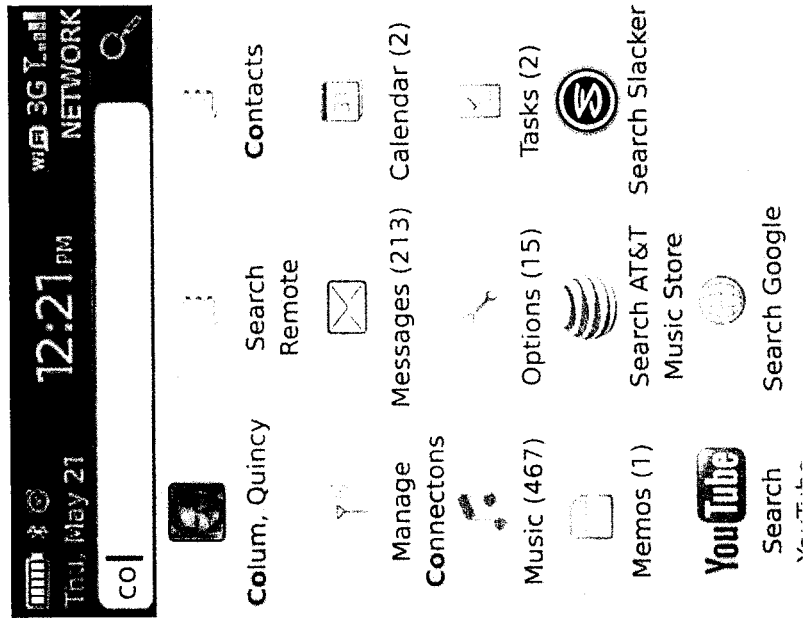
Figure 8E:
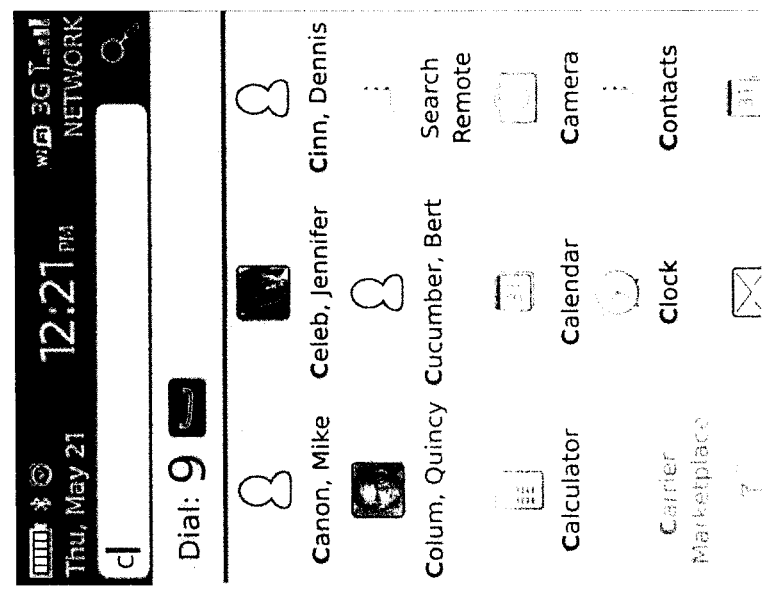
Figure 8G:
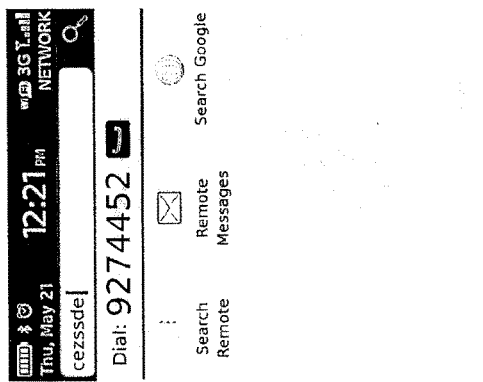
Figure 8H:
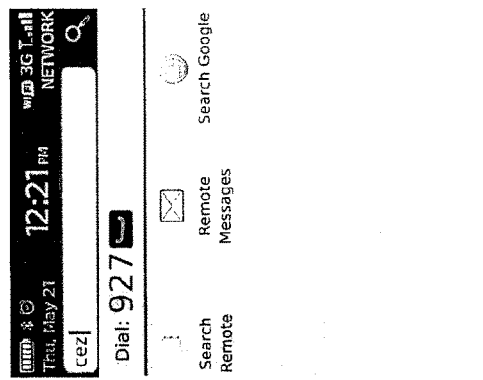
Figure 8I:
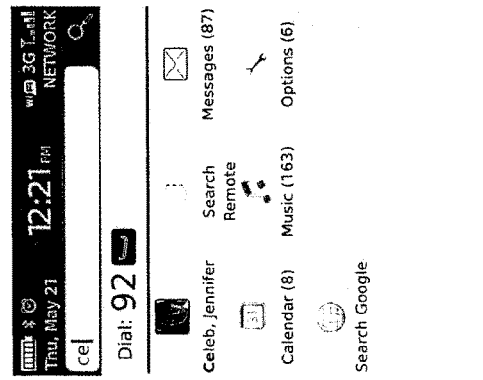
Figure 8J:
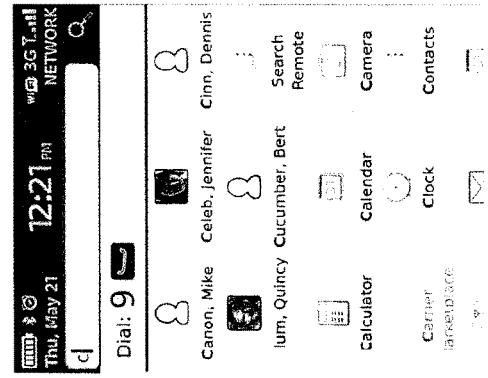
Figure 8M:
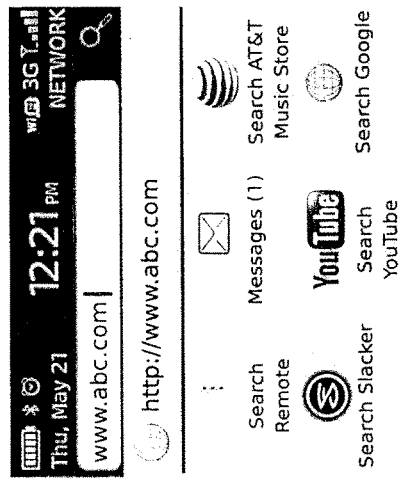

The processor 42 is configured to receive entry of a search term into the search bar via the at least one input device 38. FIG. 8C illustrates the letter "c" being entered into the search bar. After entry of a search term, the processor 42 is configured to search the application data for the search term to thereby determine whether each application of the plurality thereof has search results associated therewith. The processor 42 presents applications having search results associated therewith on the application selection screen, without displaying the search results, on the display 36. FIG. 8U shows search results for the search term "c" being displayed. Applications having search results associated therewith, such as the calendar and contacts application are displayed.

Figure 8L:
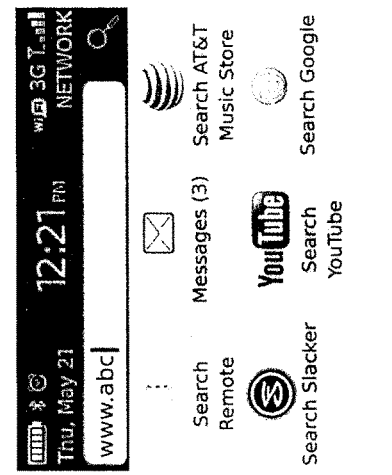
Figure 8K:
Figure 8Q:
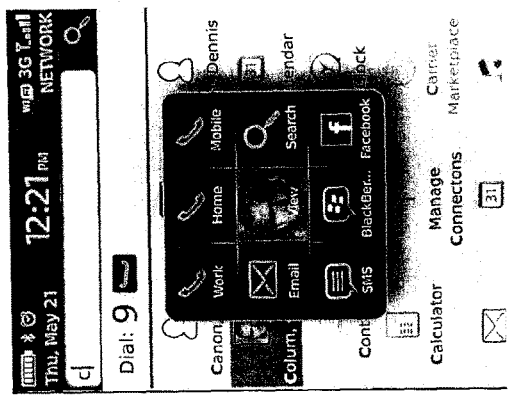
Figure 8P:
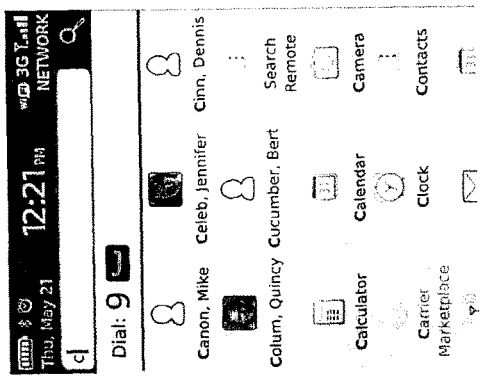
Figure 8O:
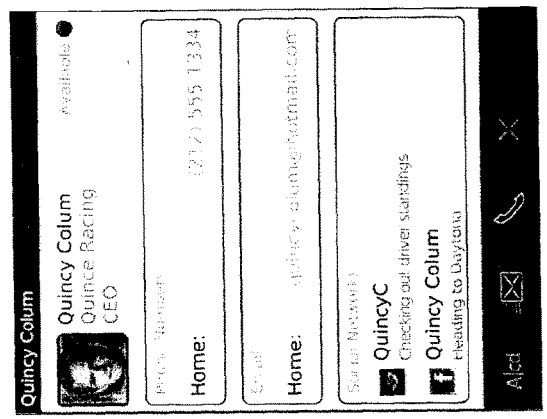
Figure 8N:
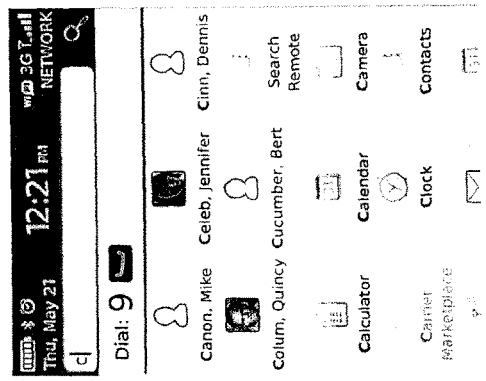
Figure 8T:
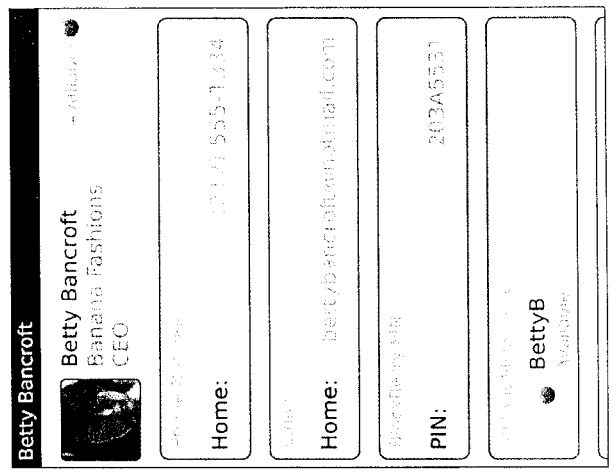
Figure 8S:
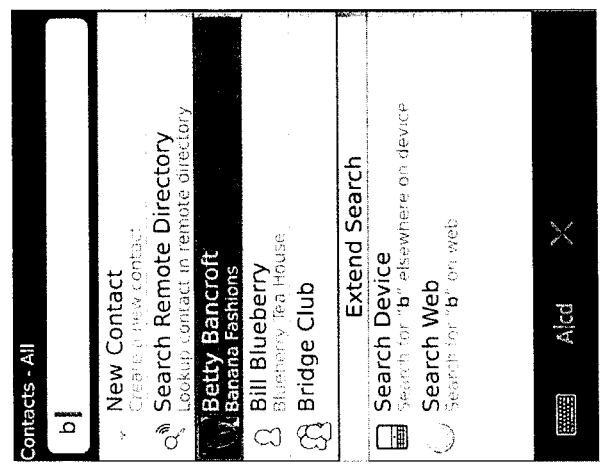
Figure 8R:
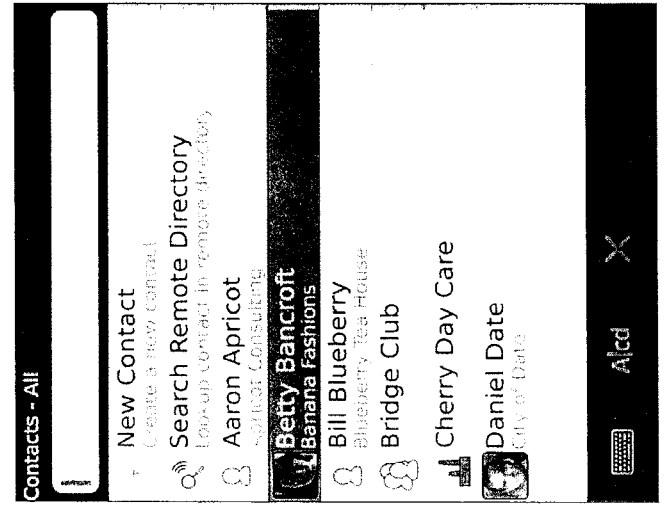
Figure 8W:
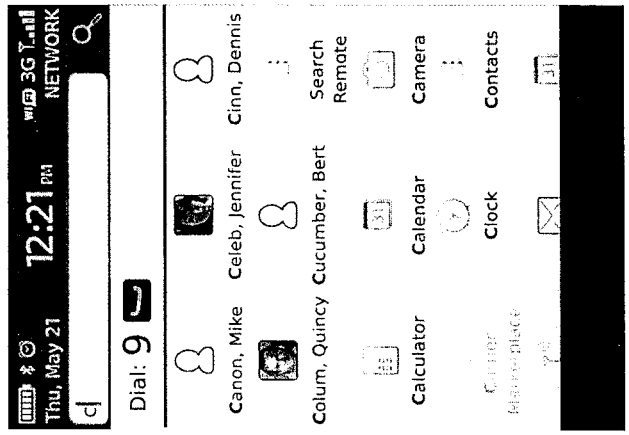
Figure 8V:
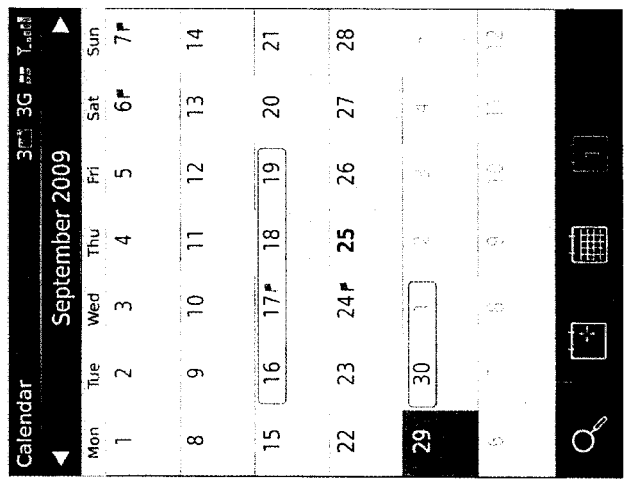
Figure 8U:
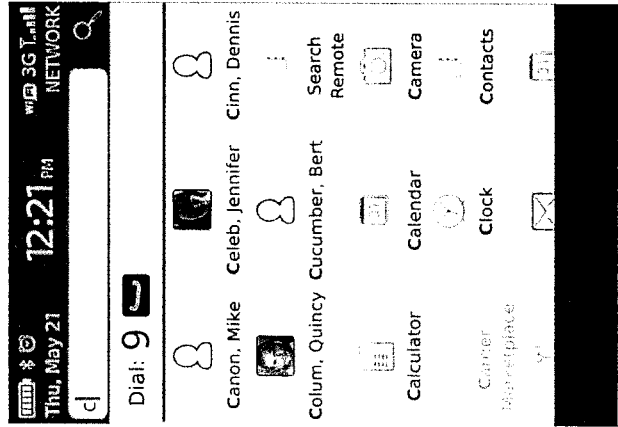

The processor 42 is also configured to receive selection of an application of the plurality thereof via the at least one input device 38. The processor 42 then executes the selected application to thereby present the search results on the display 36. An example is shown in FIG. 8X, where the search term "col" has been entered, and a messaging application has been launched to thereby show the search results associated therewith in FIG. 8Y. (The example search results associated therewith are emails from sender "Colin Davidson" and "Colton Chasey" and an email with the subject "FW: Color choices for next year".)

This mobile wireless communications 30 advantageously allows the presentation of a variety of search results of different types in an organized fashion on a single search results screen. This helps to decrease the amount of time a user spends looking through the search results for a proper entry or entries.

Figure 2:
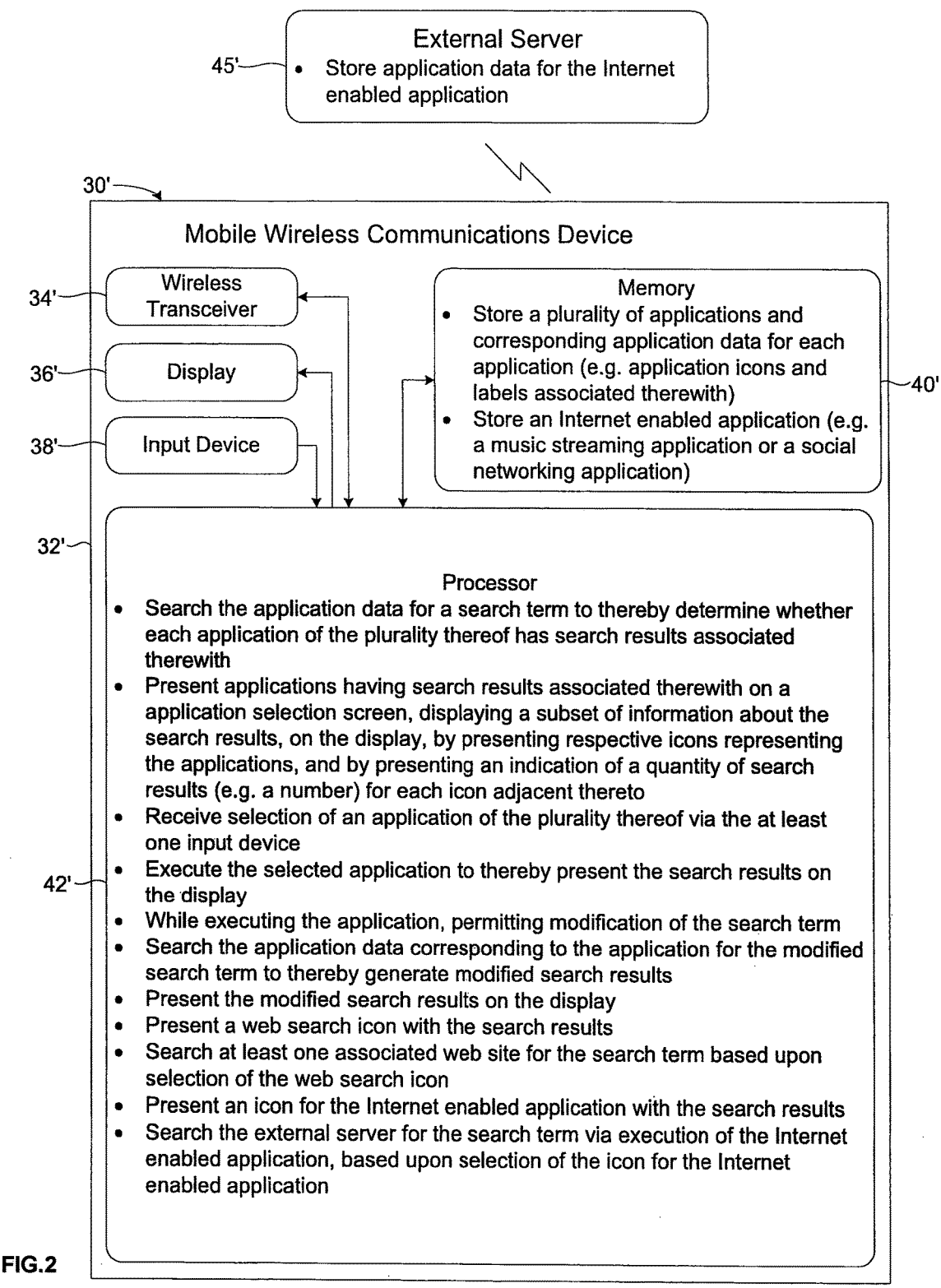
FIG. 2 is a schematic block diagram of another example embodiment of a mobile wireless communications device in accordance with the present disclosure.

Another example embodiment of the mobile wireless communications device 30' is now described with reference to FIG. 2. Here, the application data stored in the memory 40' includes application icons and labels associated therewith. The memory 40' is also configured to store an Internet enabled application. It should be understood that an Internet enabled application is an application executed by the processor 42' that retrieves data from the Internet. Example Internet enabled applications include music streaming applications, video streaming applications, and social networking application, for example. Application data for the Internet enabled application is stored on an external server 45'.

In addition, the processor 42' is configured to present the applications having search results associated therewith on the application selection screen, displaying a subset of the information about the search results, on the display, by presenting respective icons representing the applications, and by presenting an indication of a quantity of search results (e.g. a number) for each icon adjacent thereto. This is shown in FIG. 8D, for example, where an icon and label for the messages application is displayed, and "(213)" is displayed adjacent to the label for the messages application icon, indicating that there are 213 search results for the search term from among the application data stored for the messages application.

Furthermore, while executing the application, the processor 42' is configured to permit modification of the search term. The processor 42' searches the application data corresponding to the application for the modified search term to thereby generate modified search results, and presents the modified search results on the display 36'. This feature usefully allows further refinement of a search from inside an application, without necessitating exiting the application and a return to the search bar.

Figure 10A:
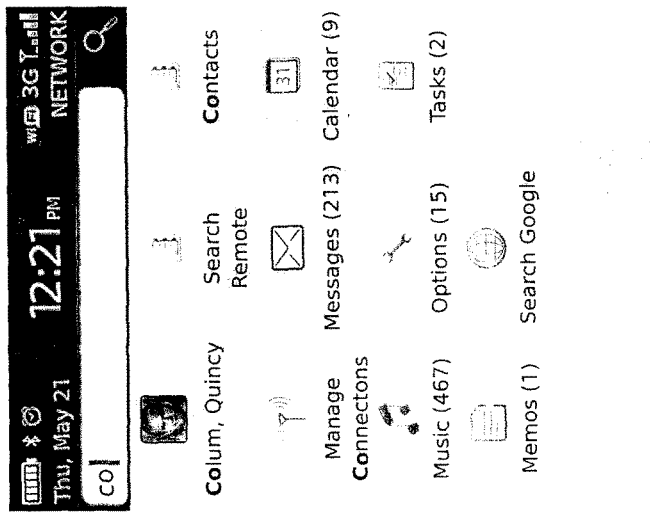
FIGS. 10A-10Y illustrate a mobile wireless communications device, such as those of FIGS. 1, 2, and 4, performing a comprehensive search, in accordance with the present disclosure.
Figure 10B:
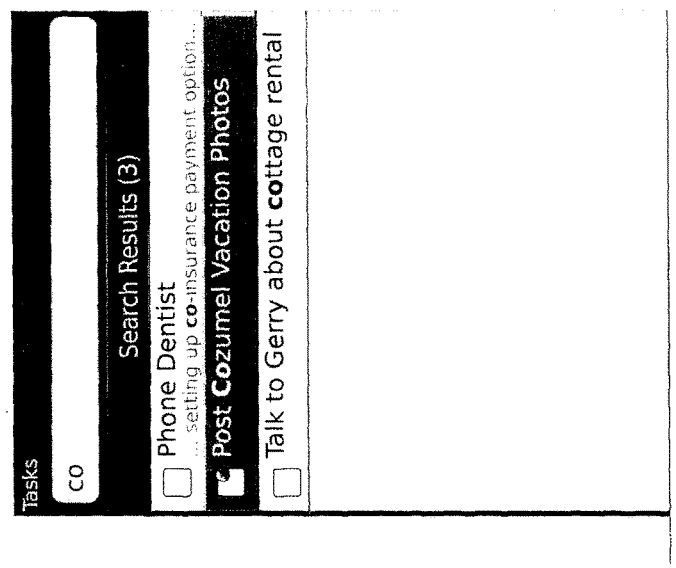
Figure 10C:
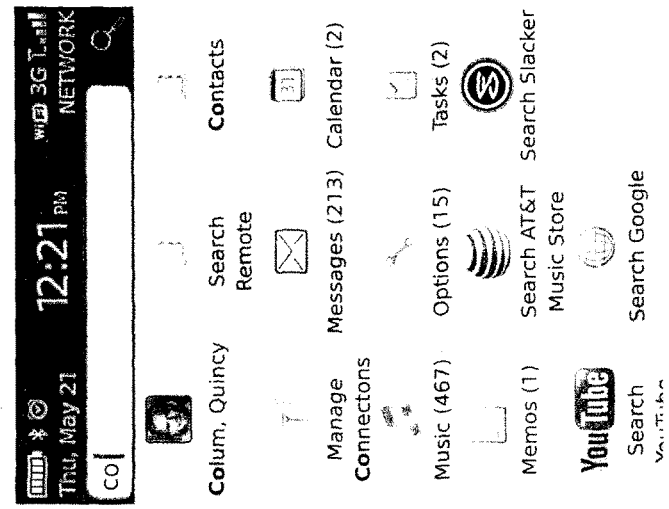
Figure 10F:
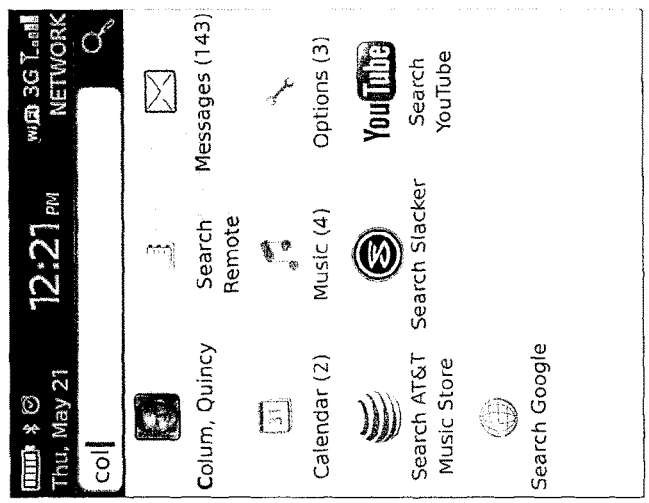
Figure 10E:
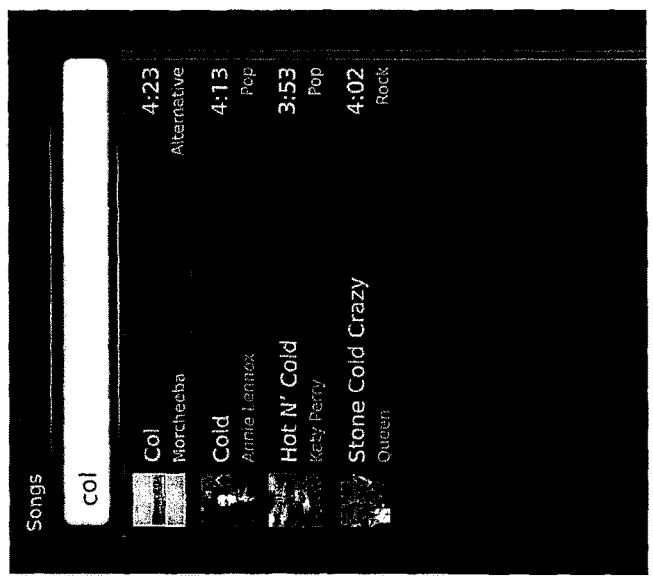
Figure 10D:
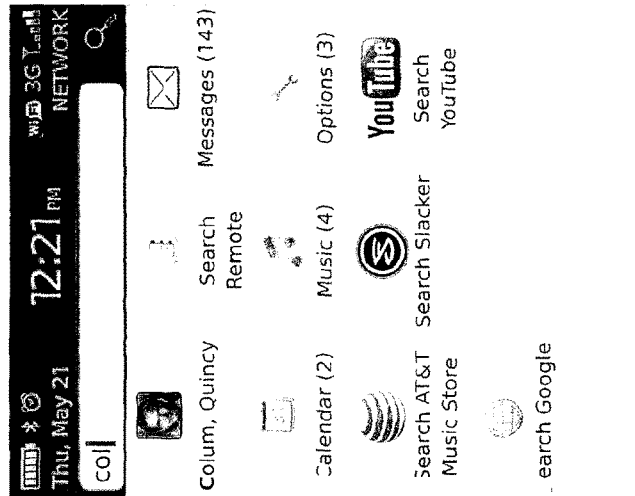
Figure 10H:
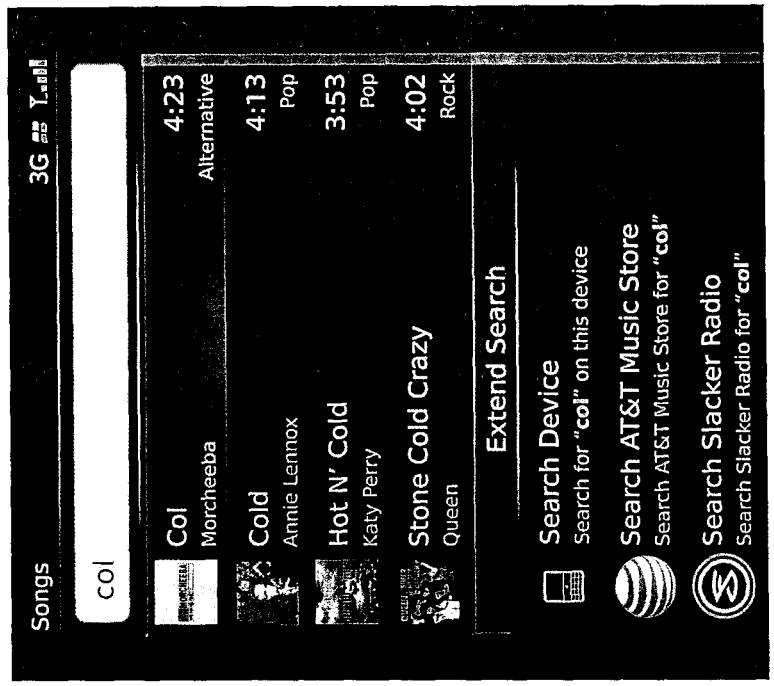
Figure 10G:
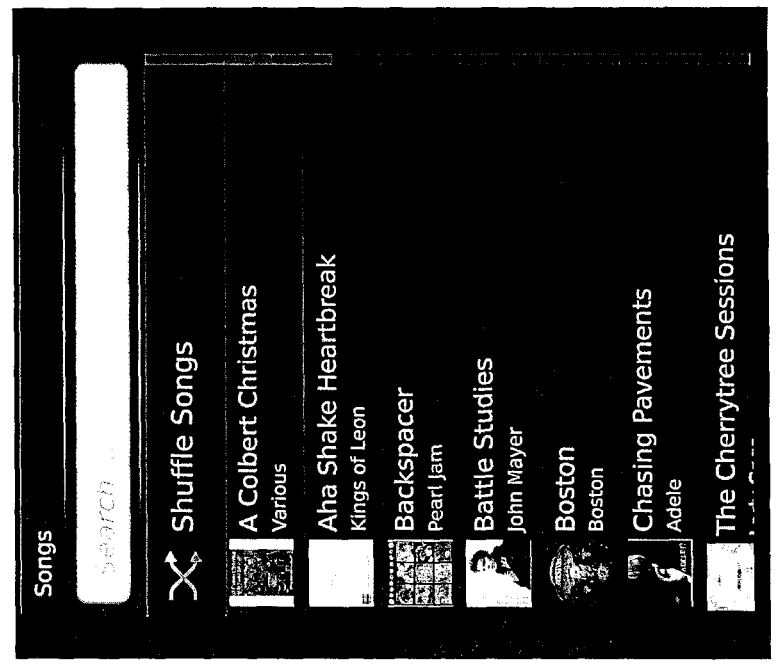
Figure 10K:
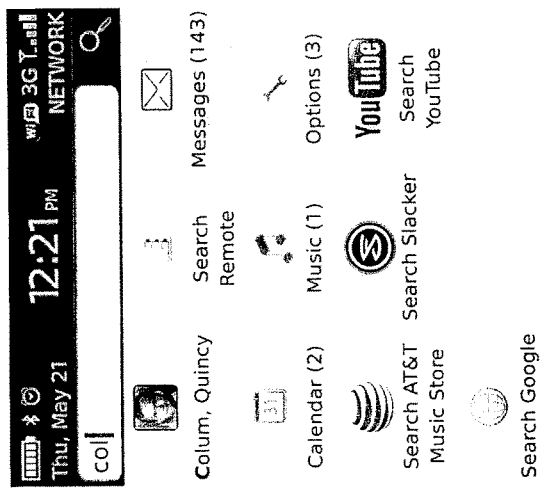
Figure 10J:
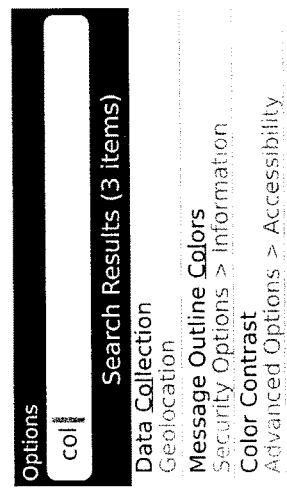
Figure 10I:
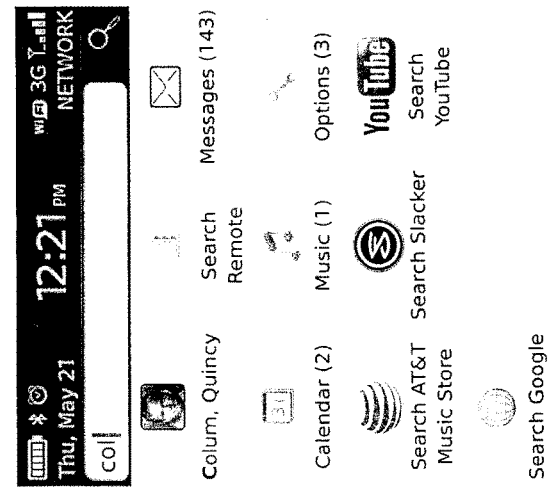
Figure 10N:
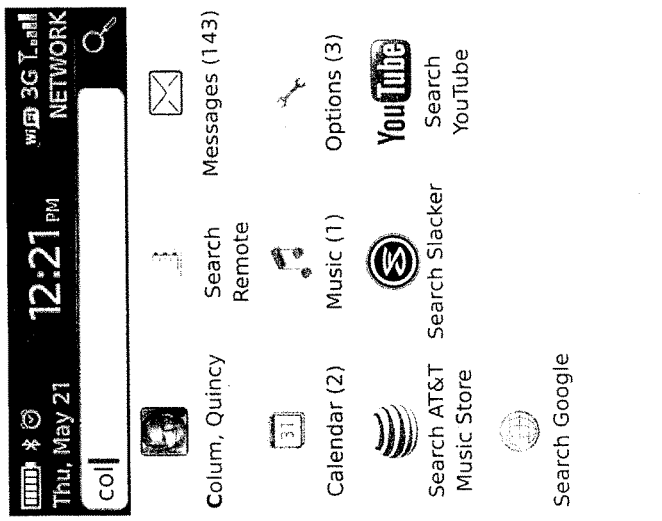
Figure 10M:
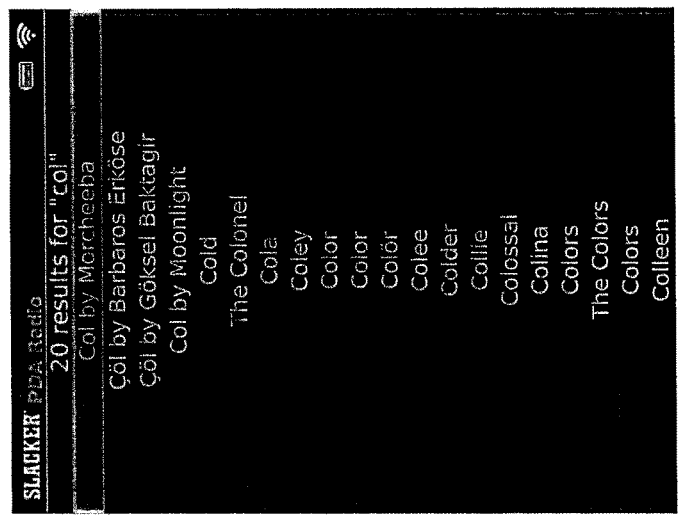
Figure 10L:
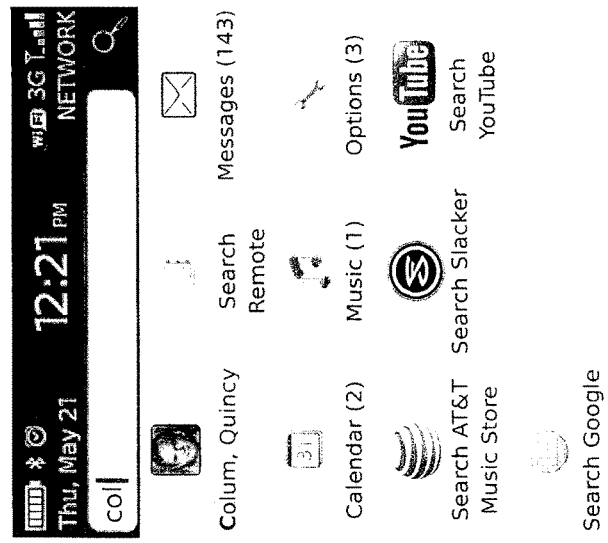
Figure 10Q:
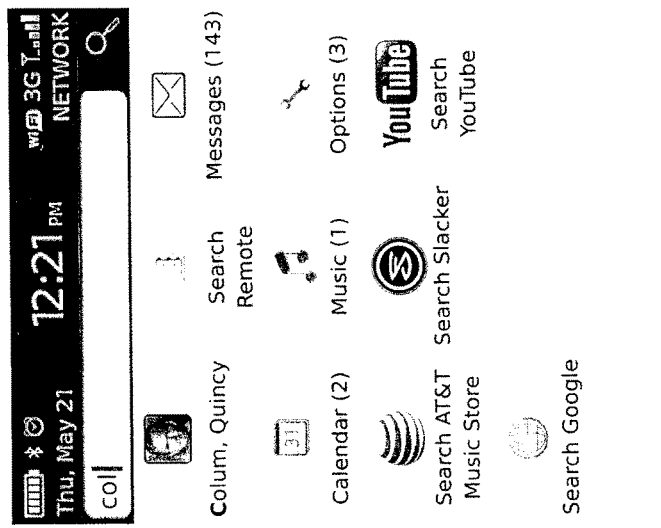
Figure 10P:
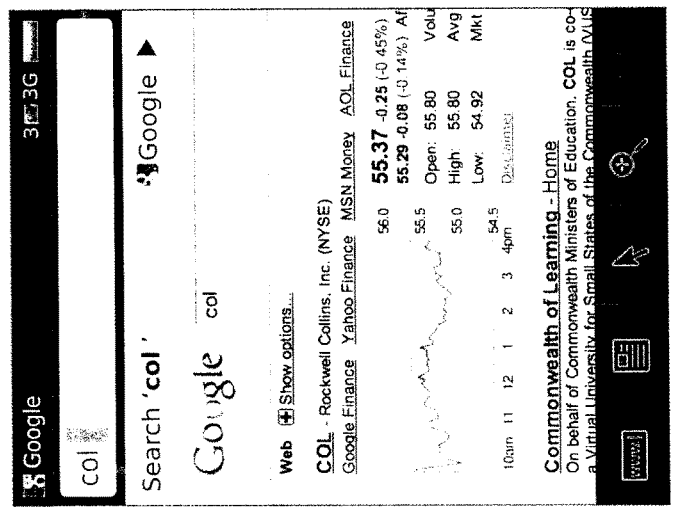
Figure 10O:
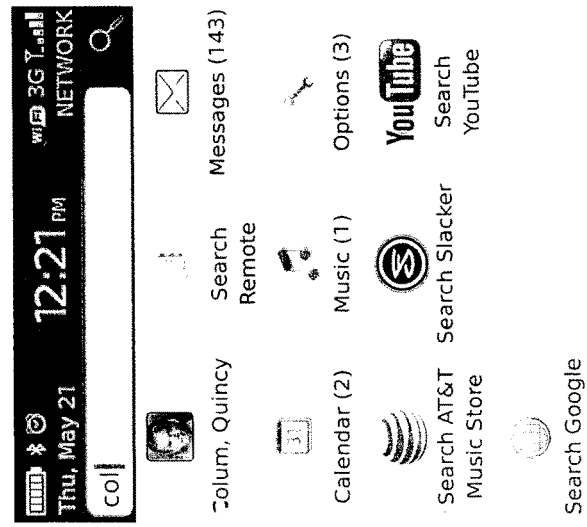

The processor 42' is also configured to present a web search icon with the search results, as shown in FIG. 10O, which shows the display of a "Search Google" icon during the display of search results. Upon selection of the web search icon, the processor 42' searches at least one associated web site for the search term, and displays the search from the at least one associated web site, as shown in FIG. 10P. This feature provides users with a quick and easy way to extend a search outside of the data stored on the mobile wireless communications device 30', without requiring an exit of the search results screen, execution of a web browser, and subsequent manual entry of the search term into the web browser, as is typical in existing methods.

The processor 42' is also configured to present an icon for the Internet enabled application with the search results, as shown in FIG. 10L, which shows the display of a "Slacker" icon during the display of search results, indicating the option of searching the Slacker music streaming application for the search term. Based upon selection of the icon for the Internet enabled application, the processor 42' searches the external server for the search term via execution of the Internet enabled application and displays the results, as shown in FIG. 10M, where the Slacker application is executing and displaying search results for the search term "col." This feature provides users with a quick and easy way to extend a search outside of the data stored on the mobile wireless communications device 30', without requiring an exit of the search results screen, execution of an Internet enabled application, and subsequent manual entry of the search term into a search function of the Internet enabled application, as is typical in the prior art.

Figure 3:
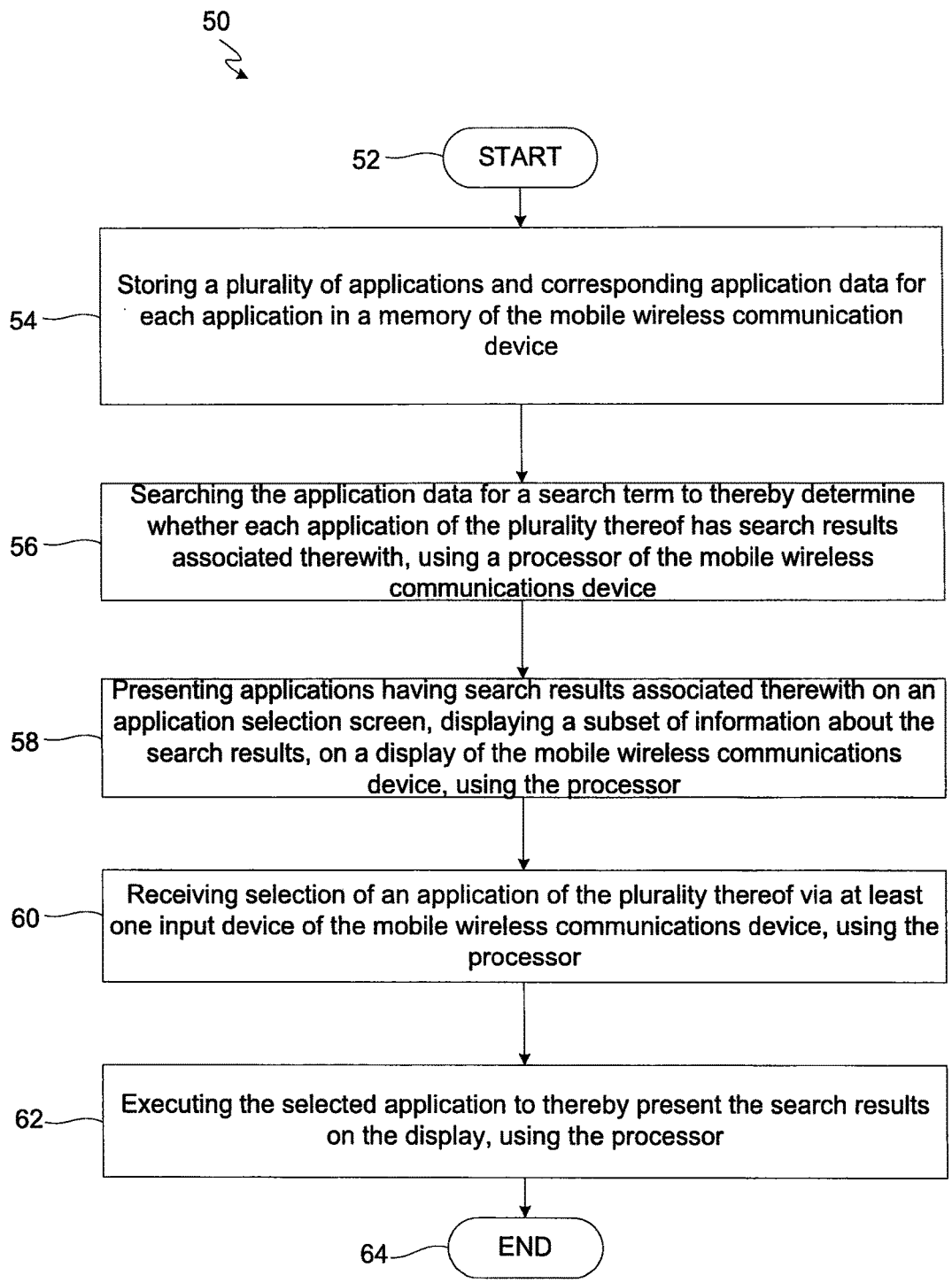
FIG. 3 is a flowchart of a mobile wireless communications device in accordance with the present disclosure.

A method of operating the mobile wireless communications devices 30, 30' described above is now discussed with reference to the flowchart 50 of FIG. 3. After the start (Block 52), a plurality of applications and corresponding application data for each application are stored in a memory of the mobile wireless communication device (Block 54). The application data is then searched for a search term to thereby determine whether each application of the plurality thereof has search results associated therewith, using a processor of the mobile wireless communications device (Block 56).

Applications having search results associated therewith are then presented on an application selection screen, without displaying the search results, on a display of the mobile wireless communications device, using the processor (Block 58). Selection of an application of the plurality thereof is then received via at least one input device of the mobile wireless communications device, using the processor (Block 60).

The selected application is then executed to thereby present the search results on the display, using the processor (Block 62). Block 64 indicates the end of the method.

Figure 4:
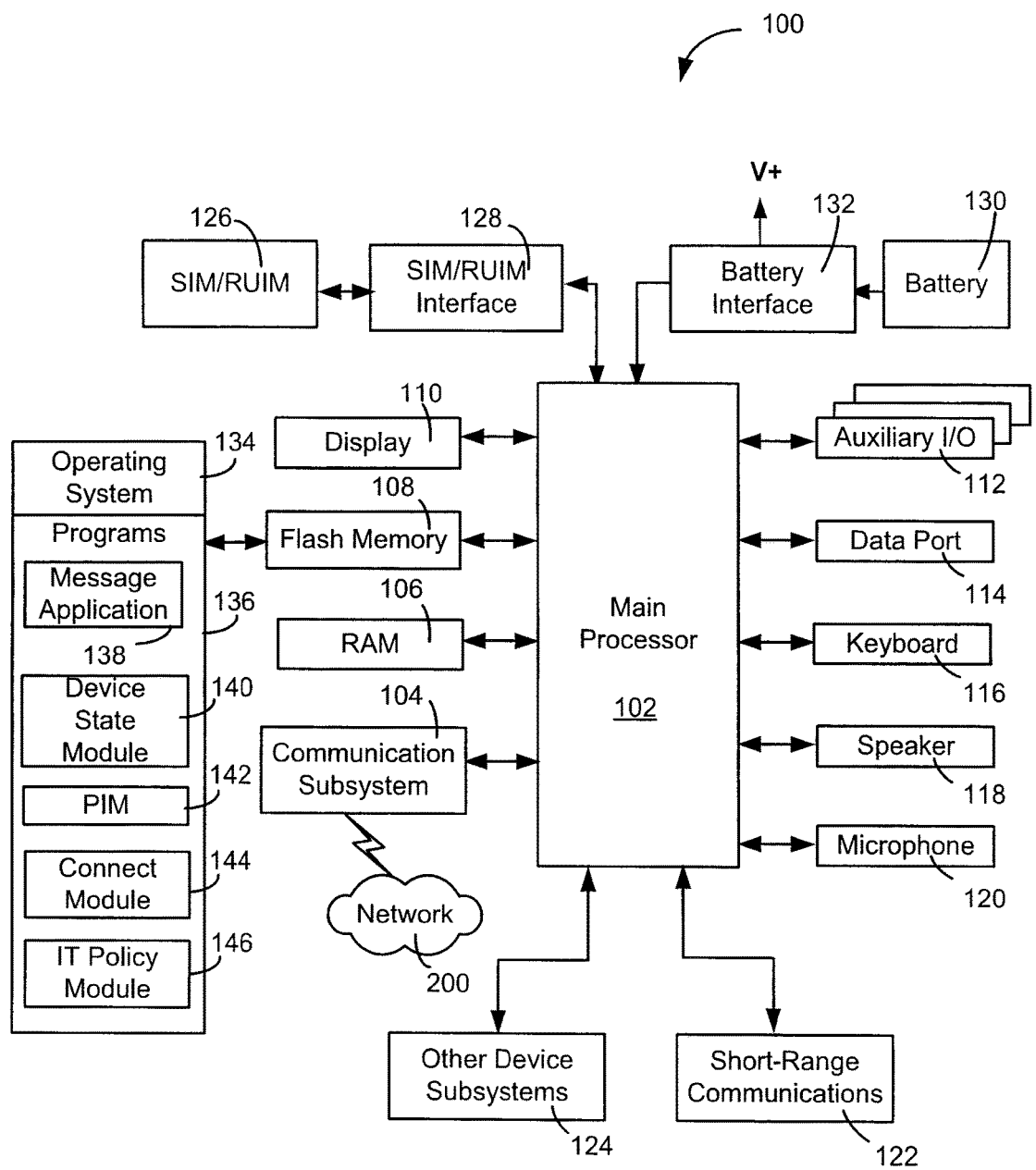
FIG. 4 is a block diagram of an example embodiment of a mobile device, such as may be used with the embodiments disclosed herein.

In an example embodiment shown in FIG. 4, a mobile device 100 is configured to perform a comprehensive search on content accessible to the mobile device and implement other example embodiments disclosed herein. The searchable content may include software applications 136 and files located on the mobile device. The software applications 136 may include messaging application 138, PIM application 142, as well as other software applications which are not shown in FIG. 4, such as social networking and device help applications. The searchable content may also include files stored on the mobile device, such as media files such as photos, videos, songs or documents such as word processing documents or presentations documents. The searchable content may also include remote sources accessible to the mobile device through wireless network 200, such as a music library stored on a personal computer, documents stored on a work computer, and data stored at host system 250, such as data stored at contact server 276 or message server 268.

Certain context information may be actively (by the user) or passively (by the mobile device) input into the comprehensive search method to tailor the search results. Examples of such context information include location context information such the current location of the mobile device, and a user's personal context information such as a user's search profile stored on the mobile device.

The results of comprehensive search (from e.g. searching on content from various sources located on the device and remote to the device), may be sorted and/or grouped or otherwise organized. For example, the search results may be grouped by the source of content searched, such as content stored on the mobile device or content obtained from a remote source. In another example, the search results may be grouped by context, such as location context or context provided by a user's preferences (e.g. in a user's search profile stored on the mobile device). In yet another example, the search results may be sorted by date of the content.

The comprehensive search on a mobile device can be invoked by a user typing in the home screen of the mobile device. Upon the user typing in the home screen, a search box window may pop up and the user may complete his/her search query in the window.

In some applications, if the user enters a URL into the search box at the home screen, the user is given the option to access to that URL. Upon further user input, such as the user performing an action on keyboard 116 (e.g. pressing a key) or performing an action on a device of the auxiliary subsystem 112 of the mobile device (e.g. touching a touchscreen of the mobile device, pressing trackball or pressing a track pad), a browser (with the web page of the URL) may then be launched.

Figure 8Z:
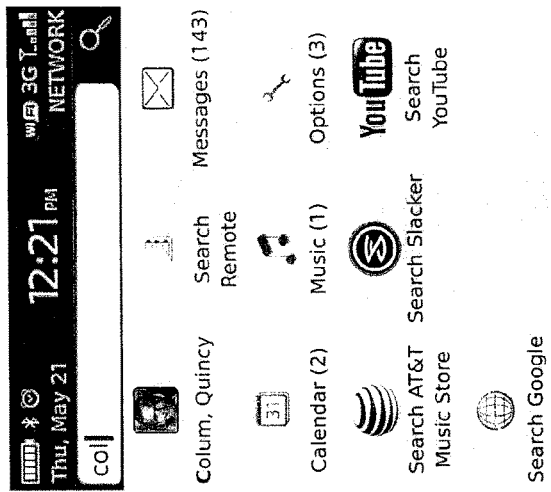

With initial reference to FIGS. 8A-8Z, features of the comprehensive search are now described. As shown in FIG.

8A, the comprehensive search is easily accessible, and can be launched from the home screen, as there is a search icon in a status bar. The search may be triggered by an input device such as a keyboard, while the home screen is displayed.

When the search is triggers, a search bar is displayed on the screen, as shown in FIG. 8B. As each letter of the search term is entered, search results are graphically presented, as shown in FIG. 8C. Low instance matches may be shown individually (e.g. contacts, applications), while high instance matches may be grouped into categories (e.g. messages, music), as shown in FIG. 8D.

The search results are presented in a variety of suitable order. A preferred order for presentation of search results, as shown in FIG. 8E, may be: 1. contacts, 2. applications, 3. application data stores, and 4. remote searches (e.g. web searches). Contacts may be grouped such that on device matches are presented first, and remote matches are presented thereafter. Application matches may be presented in a same order as icons on the home screen, and hidden application matches may be shown as well. For application data stores, matches may be presented in a same order as the home screen icons. This comprehensive search advantageously offers the ability to search off the device for matches (e.g. remote lookup, search music store, search web), as shown in FIG. 8F.

The input device may be a keyboard, and some keys thereof may have both a number and letter or other character assigned thereto. If these keys are configured such that a letter is entered into the search prompt, the comprehensive search may present an option to dial the phone number that the associated letters represent, as shown in FIGS. 8G-8J.

If the letters or characters entered are such that no associated phone number corresponds to the entered letters or characters, the dial option may disappear, as shown in FIGS. 8K and 8L. As also shown in FIG. 8M, when a URL is entered into the search bar, an option to launch a browser directed to that URL is presented.

As shown in FIGS. 8N and 8O, clicking on individual found contacts in the search results opens contact details. A search in progress is suspended, and the contact details are displayed in same screen that would be displayed by opening the contact in a contacts application. Pressing an escape key, or other key, may return to the search results screen, as shown in FIG. 8P. If a search in progress was suspended, it is resumed. A graphical short menu may be invoked when a contact is selected, and this short menu may provide similar features to those available from a full contacts screen, as shown in FIG. 8Q.

It should be appreciated that the comprehensive search may be launched from any application and not just the home screen. For example, the comprehensive search may be launched from a contacts screen, as shown in FIGS. 8R, 8S, and 8T.

Figure 8Y:
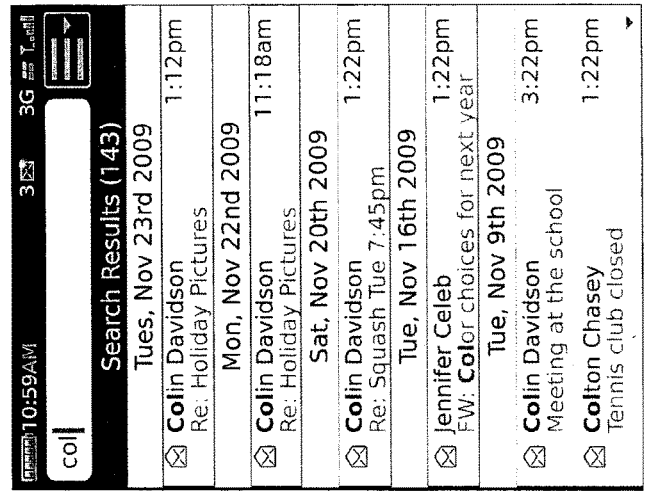
Figure 8X:
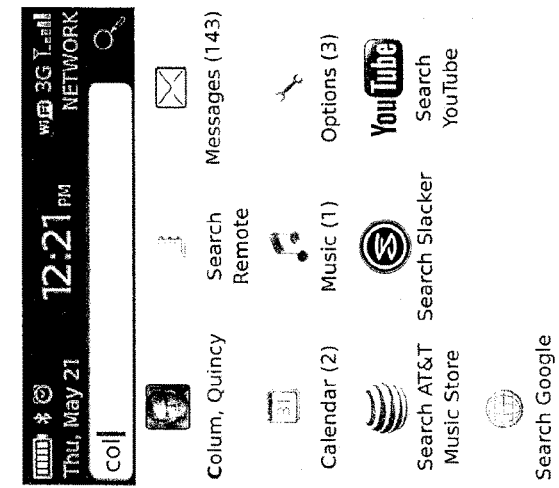

As shown in FIGS. 8U and 8V, selecting a search result for a given application, such as the calendar application) launches that application. Pressing the escape key returns to the search bar, as shown in FIG. 8W. Selecting a message search result launches the message application, as shown in FIG. 8X. As shown in FIG. 8Y, the messages application displays the messages that match the search criteria. This is a same screen that would be displayed by opening the messages application to access to all messages. Pressing escape returns to the search screen, as shown in FIG. 8Z.

Figure 9D:
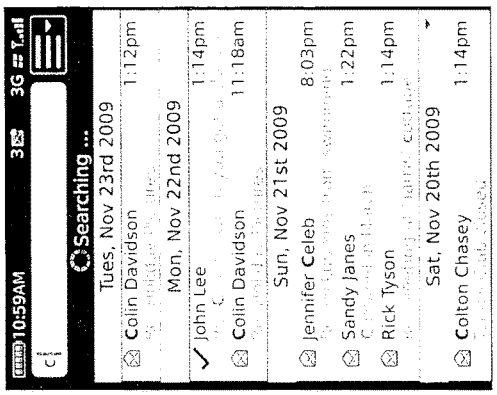
FIGS. 9A-9X illustrate a mobile wireless communications device, such as those of FIGS. 1, 2, and 4, performing a comprehensive search, in accordance with the present disclosure.
Figure 9C:
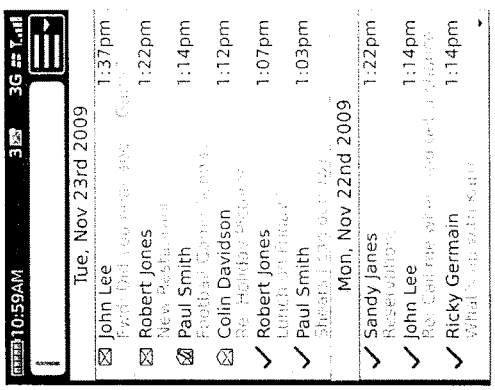
Figure 9B:
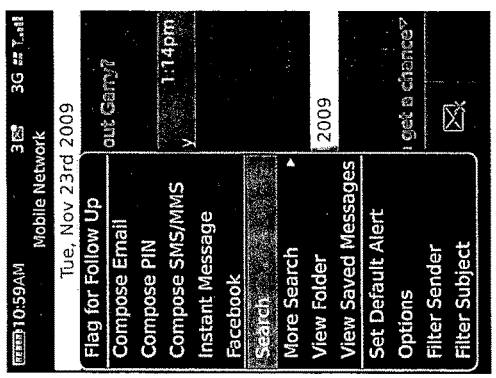
Figure 9A:
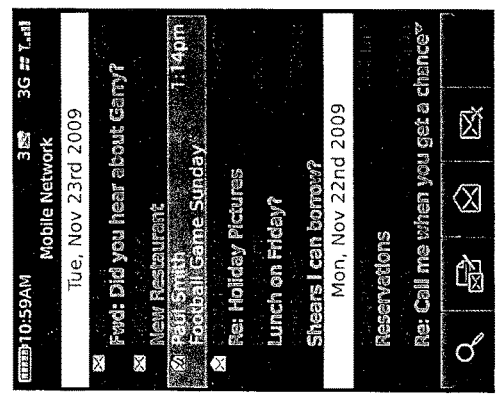

As mentioned above, the comprehensive search may be launched from inside any application. FIG. 9A shows the messaging application screen. To launch the search, a menu is called in FIG. 9B, and the search option is selected. The search bar is then launched, as shown in FIG. 9C. As shown in FIG. 9D, as the user types, matching results (with C in From field or Subject are filtered) are displayed.

Figure 9H:
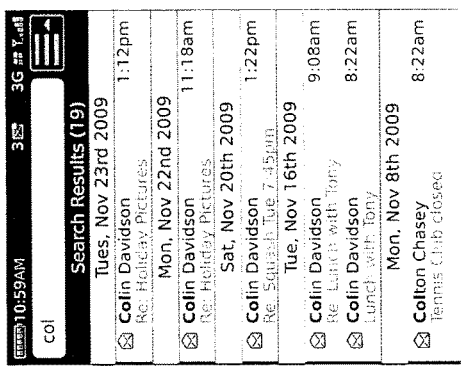
Figure 9G:
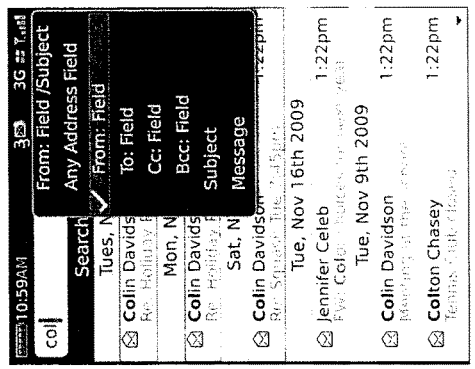
Figure 9F:
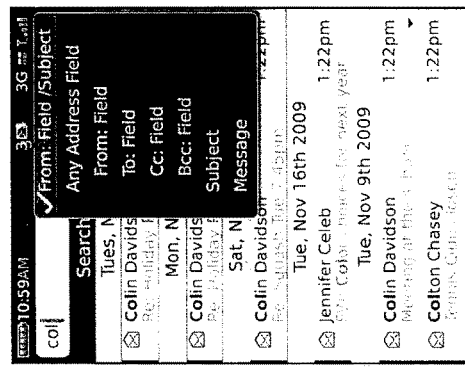
Figure 9E:
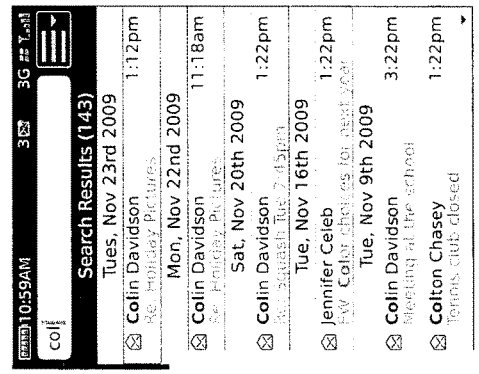

In the message application, by default, results are returned for matches in From field and Subject field, as shown in FIG. 9E. A find selector may be selected as shown in FIG. 9F, which presents options of different fields of the messages to search. The From field is selected in FIG. 9G, and in FIG. 9H, the listing of search results is updated to reflect this field selection.

Figure 9K:
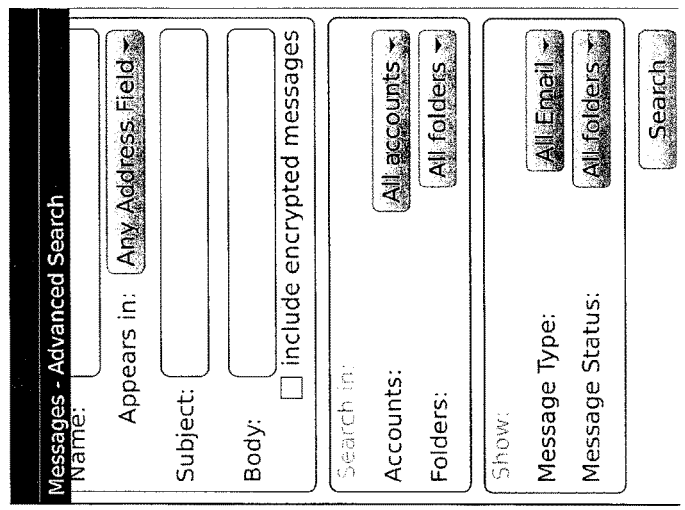
Figure 9J:
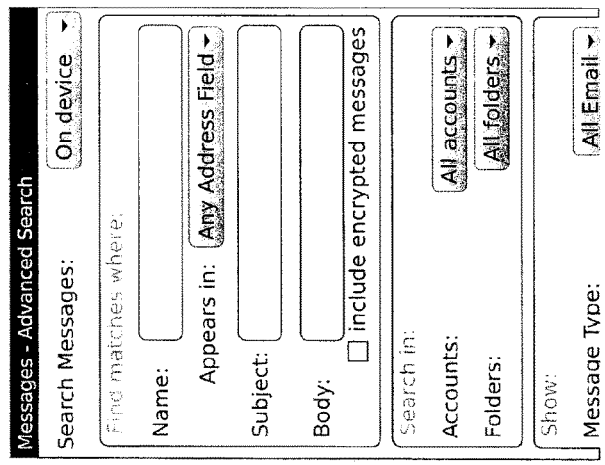
Figure 9I:
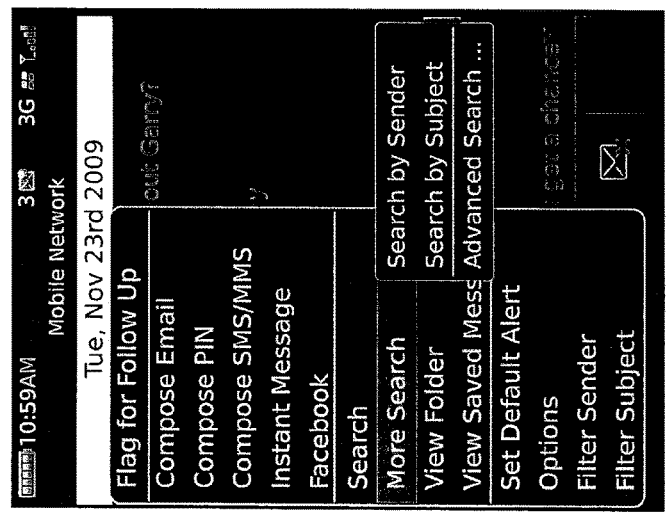

As shown in FIG. 9I, there is an advanced search option available from the menu. The advanced search screen is shown in FIGS. 9J and 9K.

Figure 9L:
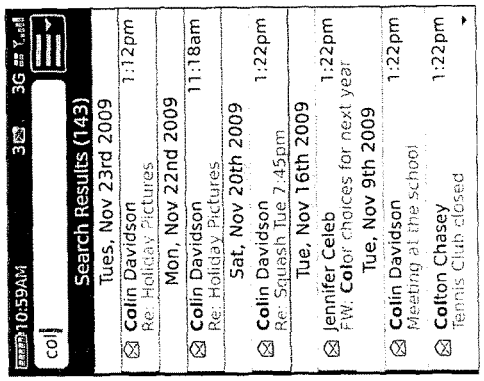
Figure 9M:
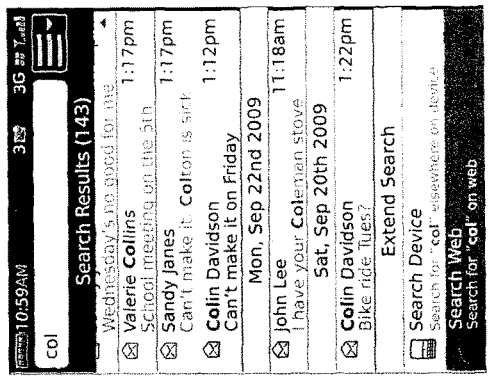
Figure 9N:
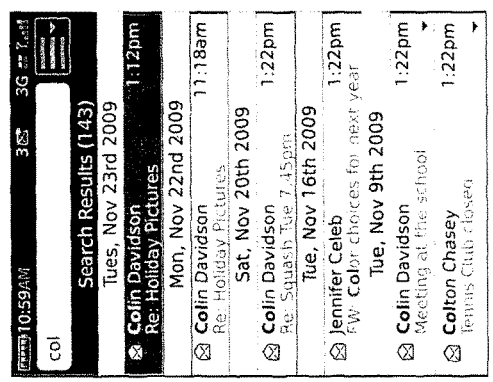
Figure 9O:
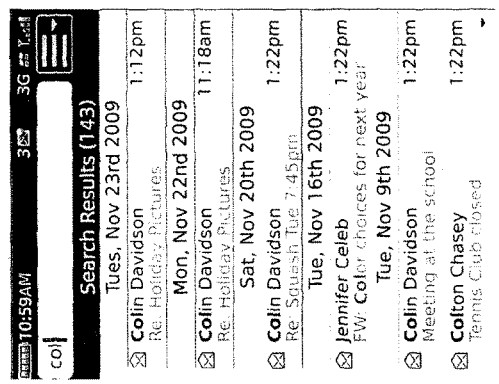

When the search field is selected, as shown in FIG. 9L, the focus of entered keystrokes is directed to the search field. However, when the focus is changed to a search results, as shown in FIG. 9M, keystrokes may be treated as shortcuts. As shown in FIG. 9N, the "B" has been pressed, and the search results list has been automatically scrolled to the bottom thereof. The "S" key may then return the focus to the search field, as shown in FIG. 9O.

Figure 9R:
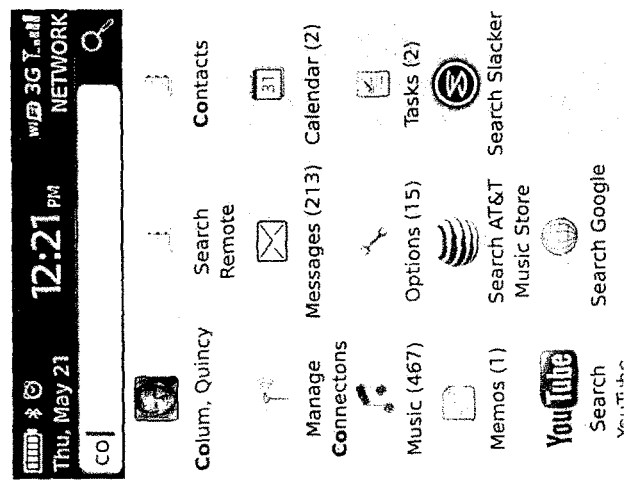
Figure 9Q:
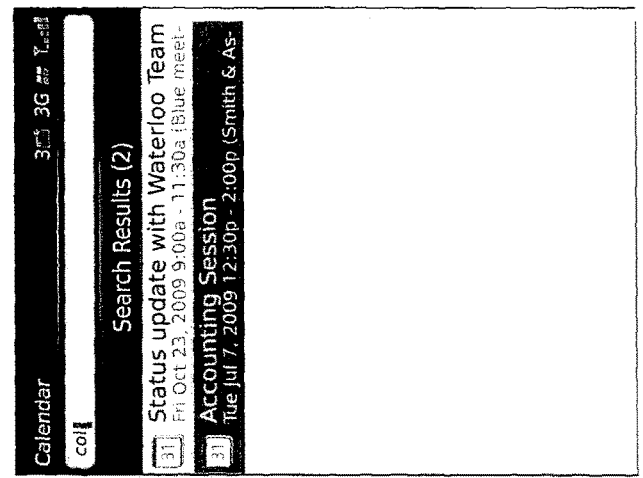
Figure 9P:
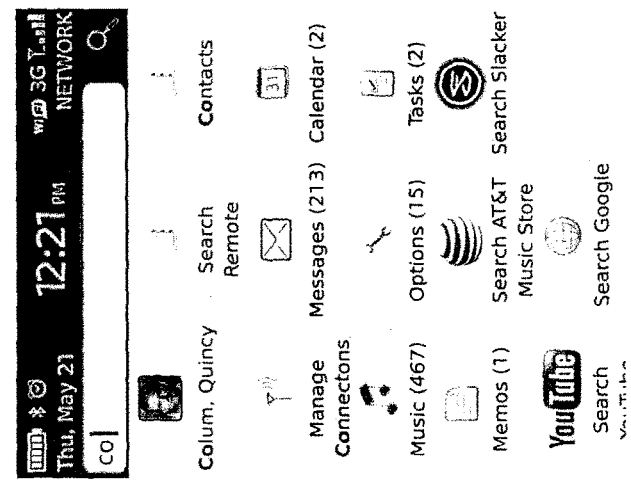

FIG. 9P shows a search results screen. If the calendar icon is selected, the calendar search results are shown as they would be from the calendar application, in FIG. 9Q. Here, the calendar application displays the events that match the criteria. This is screen is similar to an agenda view with access to all calendar actions. As shown in FIG. 9R, pressing escape key results in a return to the search results screen. If a search in progress was suspended, it may resume.

Figure 9U:
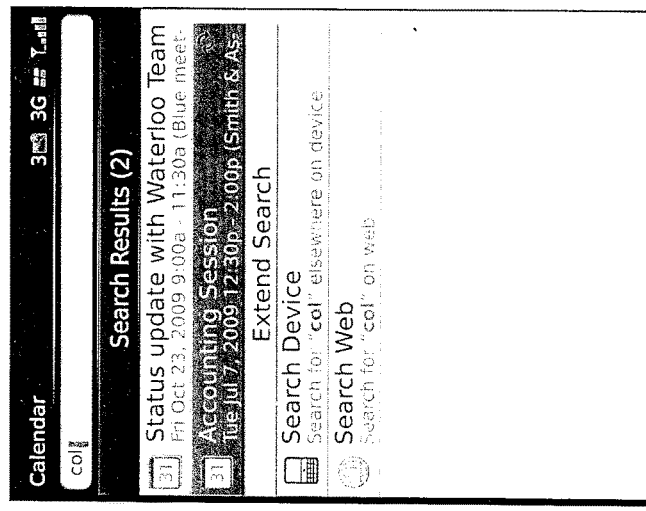
Figure 9T:
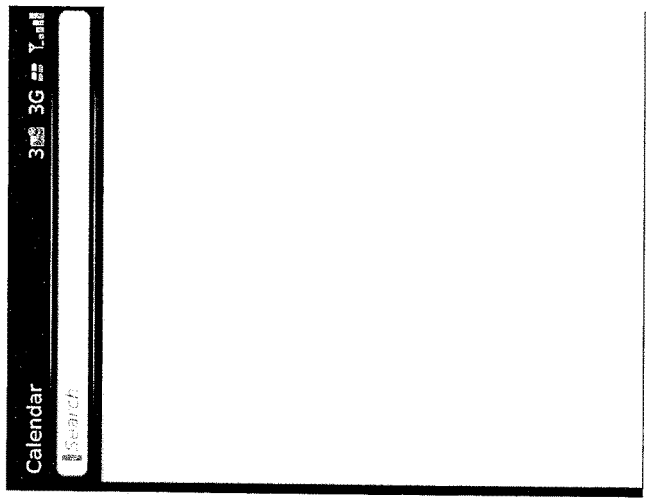
Figure 9S:
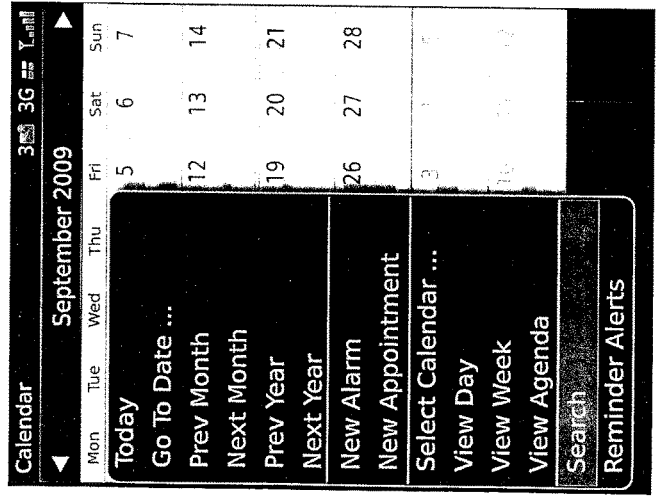

The search may be accessed from a menu in a calendar application, as shown in FIG. 9S. Upon selection of search, a search bar is shown, in FIG. 9T. Search results are shown in FIG. 9U. It should be noted that extended search results are also shown here, giving the option to search the entire device for the search term, or to search the web for the search term.

Figure 9X:
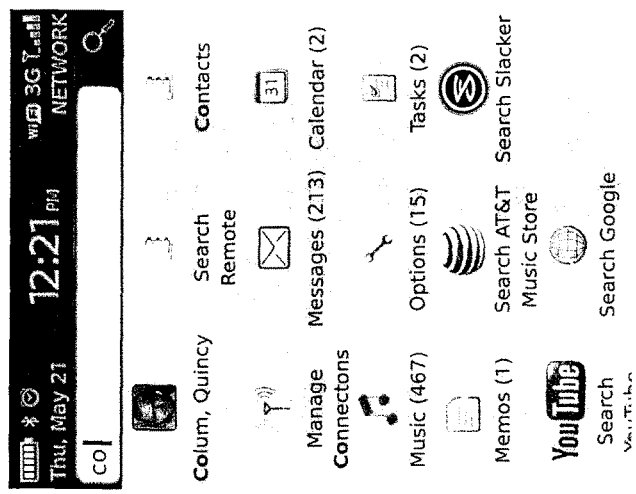
Figure 9W:
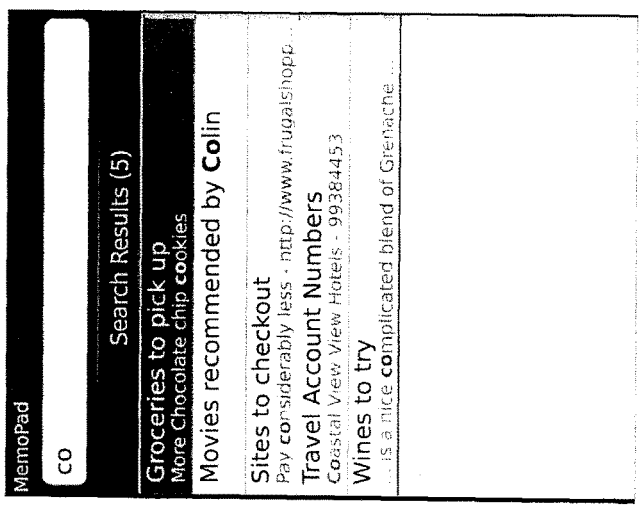
Figure 9V:
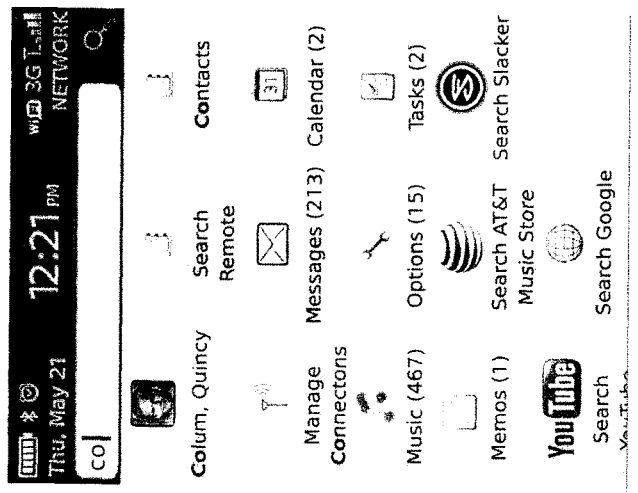

Shown in FIG. 9V are search results including results in a memo application. In FIG. 9W, the memo search results have been selected, and are displayed in a same screen that would be displayed if the memo application had been launched separately. In FIG. 9X, the escape key has been pressed, and the mobile device is again displaying the search results.

The search results shown in FIG. 10A include results in the tasks application. In FIG. 10B, the tasks search results have been selected, and are displayed in a same screen that would be displayed if the tasks application had been launched separately. In FIG. 10C, the escape key has been pressed, and the mobile device is again displaying the search results.

The search results shown in FIG. 10D include results in the music application. In FIG. 10E, the music search results have been selected, and are displayed in a same screen that would be displayed if the music application had been launched separately. In FIG. 10F, the escape key has been pressed, and the mobile device is again displaying the search results.

The comprehensive search can be accessed from the music application, as shown in FIG. 19G. Search results are shown in FIG. 10H, and extended search results are shown below the on device search results.

Search results may even be from the options application, as shown in FIG. 10I. When the options search results are selected, they are displayed in the options application, as shown in FIG. 10J. In FIG. 10K, the escape key has been pressed, and the mobile device is again displaying the search results.

In some cases, the comprehensive search may provide an option to search an application that retrieves data from the internet, such as music streaming applications. Shown in FIG. 10L are search results including an option to search the Slacker music streaming application. The Slacker search option has been selected in FIG. 10M, which displays search results from the slacker application. In FIG. 10N, the escape key has been pressed, and the mobile device is again displaying the search results.

The comprehensive search may also provide the option of searching the web. Shown in FIG. 10O are search results providing the option of searching Google. The search Google option has been selected in FIG. 10P, and Google has been loaded and is displaying search results. In FIG. 10Q, the escape key has been pressed, and the mobile device is again displaying the search results.

The comprehensive search may also search social networking notifications, and may be launched from inside a social networking application. For example, the comprehensive search may be launched from inside the Facebook application, as shown in FIG. 10R, may be launched from inside the MySpace application, as shown in FIG. 10S, or may be launched from inside the twitter application, as shown in FIG. 10T.

Figure 10V:
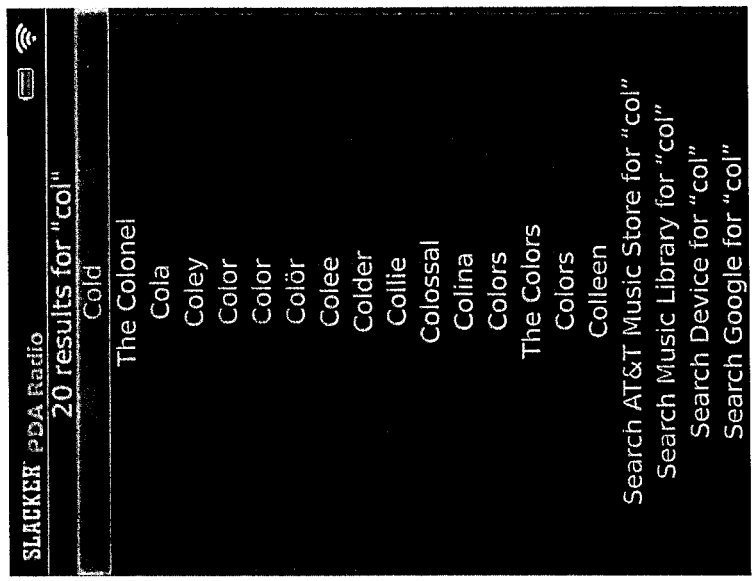
Figure 10U:
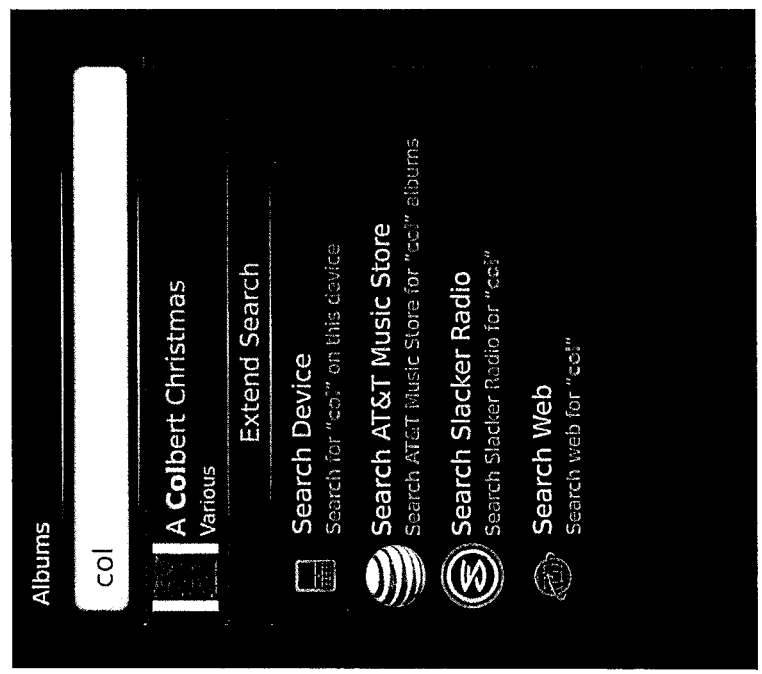

FIG. 10U illustrates music search results, including the option of searching outside sources. In FIG. 10V, the Slacker application has been selected for searching.

Figure 10Y:
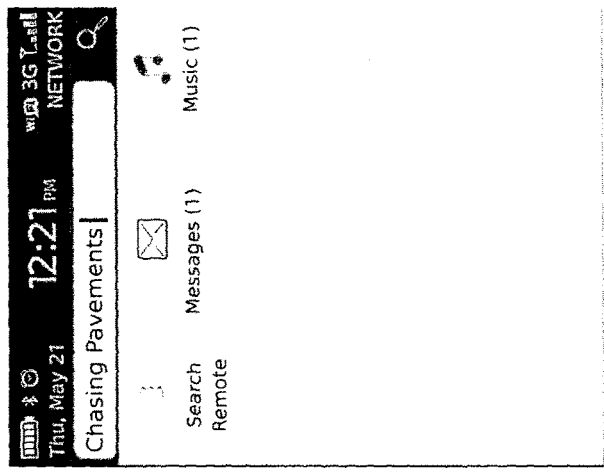
Figure 10X:
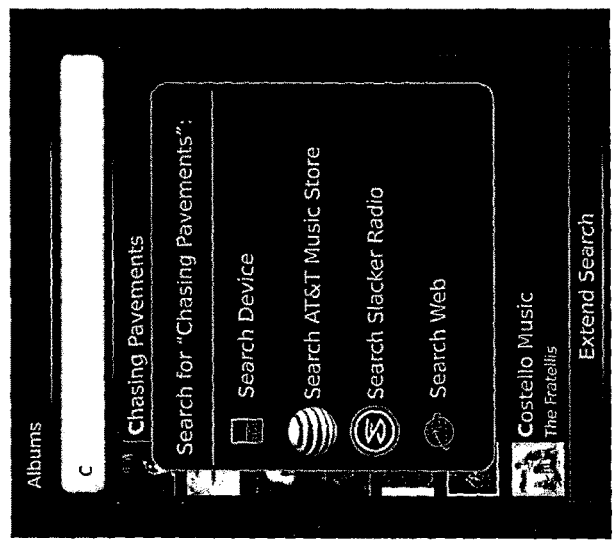
Figure 10W:
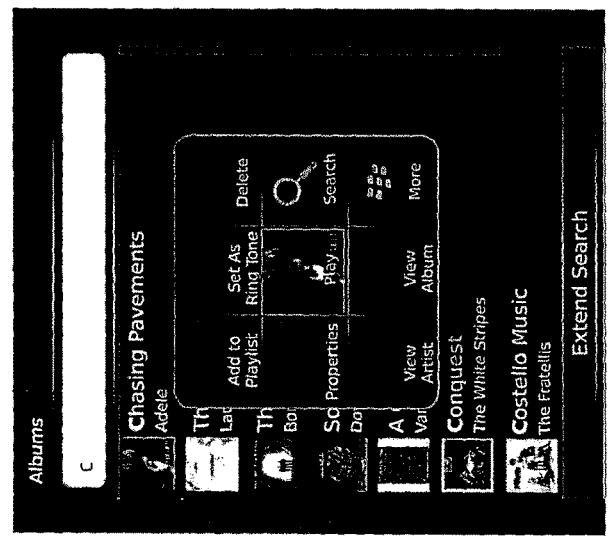

The option to perform the comprehensive search may appear in a graphical context menu, as shown in FIG. 10W. Here, the graphical context menu has been launched from inside a music application. In FIG. 10X, the search option in the graphical context menu has been selected, and a variety of additional search options are presented. In FIG. 10Y, a search device option has been selected, and search results are being displayed.

Figure 11C:
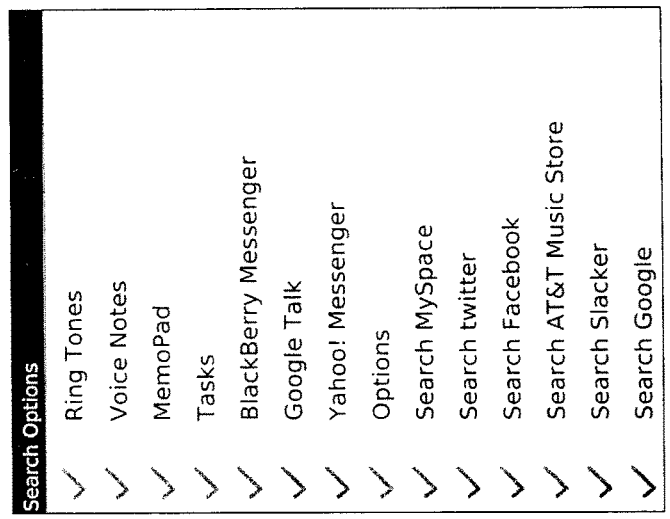
FIGS. 11A-11Y illustrate a mobile wireless communications device, such as those of FIGS. 1, 2, and 4, performing a comprehensive search, in accordance with the present disclosure.
Figure 11B:
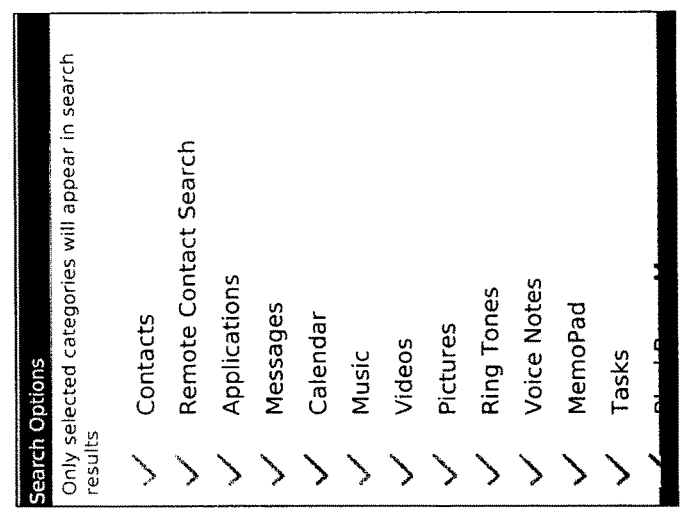
Figure 11A:
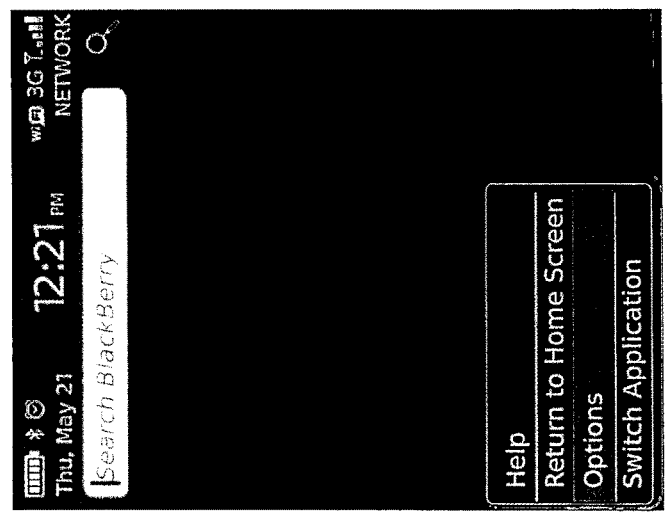

Shown in FIG. 11A is a menu opened inside a search screen, which includes an options selection. Applications registered with Universal Search will appear here, as shown in FIGS. 11B and 11C. The boxes can be checked or unchecked to include or exclude an application from the universal search results. Excluding an application from the search results does not disable search from within the application, but only from within universal search results, and from an Extend Search.

Figure 11G:
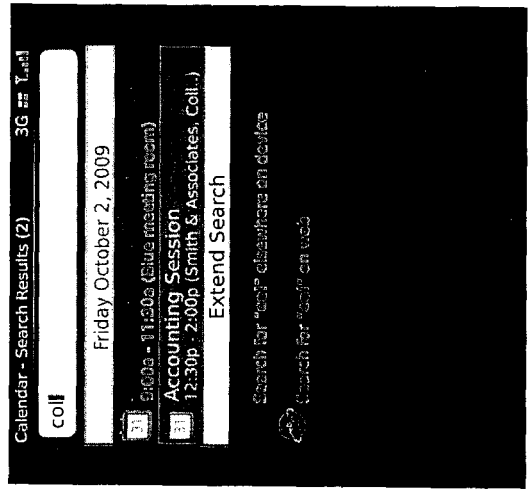
Figure 11F:
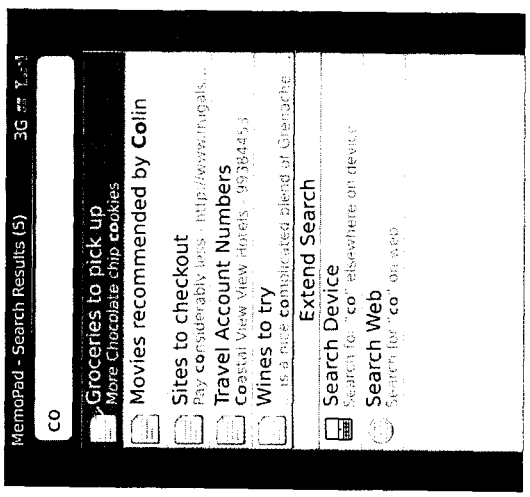
Figure 11E:
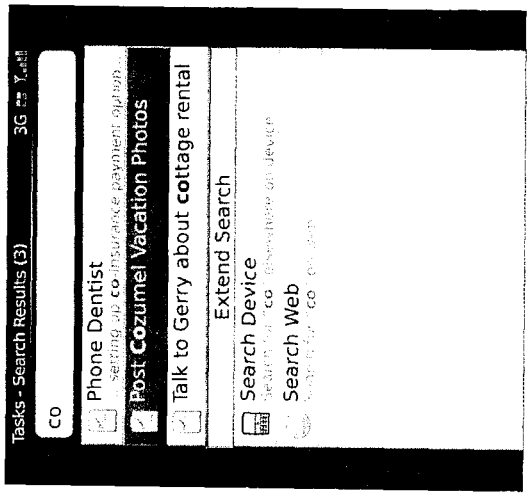

A typical search results screen is shown in FIG. 11D. Here, the results are presented in two lines with an application icon displayed adjacent. The first line contains primary identification that helps identify the found item, and the second line contains further supporting information that would assist a user in disambiguating the item. Shown in FIGS. 11E, 11F, and 11G are further examples of search result presentation.

Figure 11J:
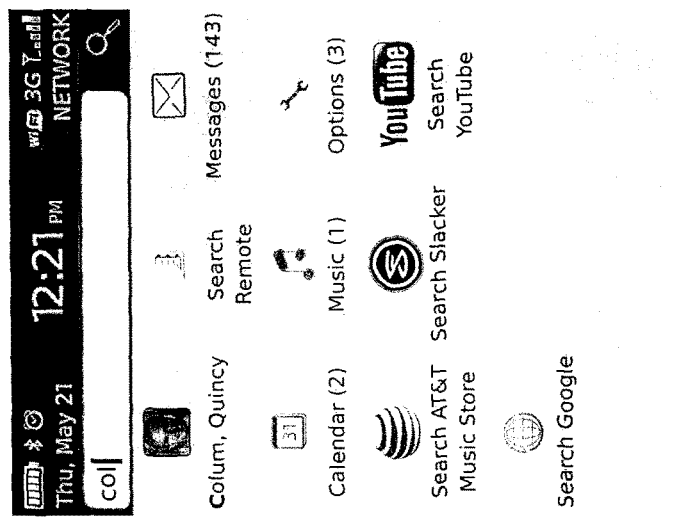
Figure 11I:
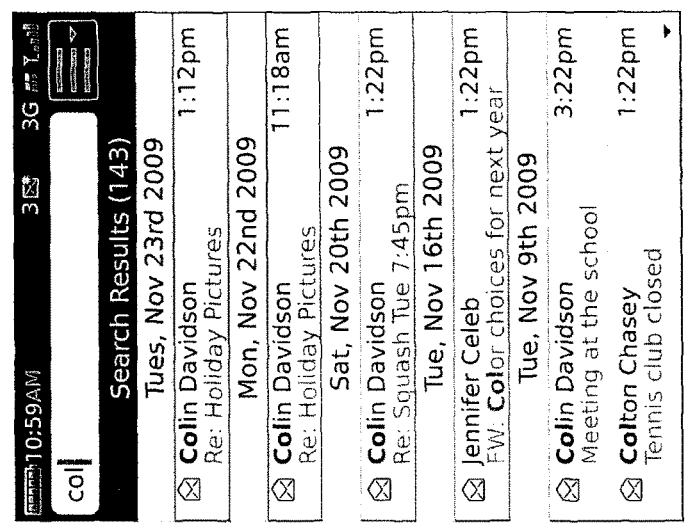
Figure 11H:
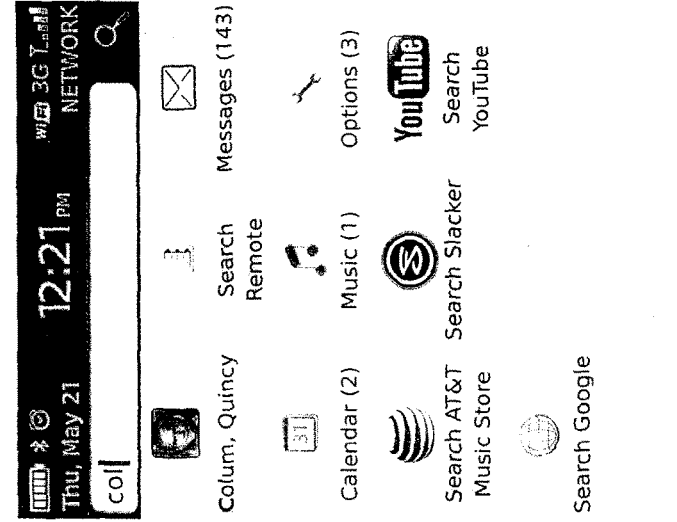

FIG. 11H shows search results, including message search results. In FIG. 11I, the message search results have been selected, and FIG. 11J shows that once the escape key has been pressed, the search results screen is again displayed.

Figure 11K:
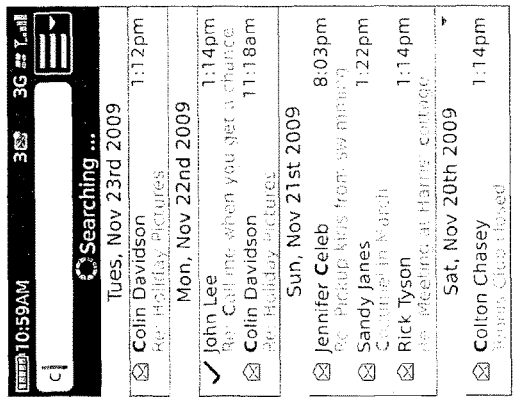
Figure 11L:
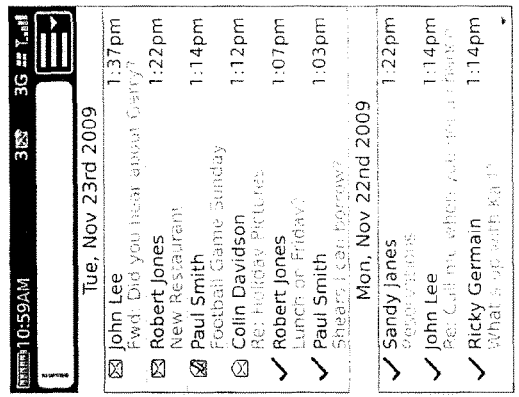
Figure 11M:
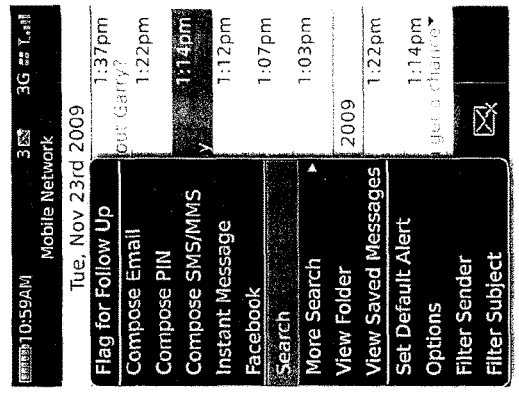
Figure 11N:
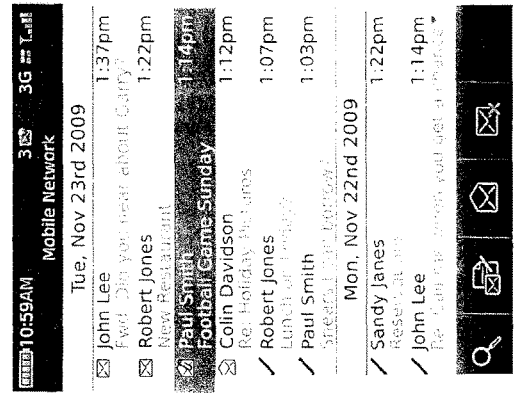

Shown in FIG. 11K is a messaging application. A menu containing a search option is called in FIG. 11L. When the search option is selected, a search bar appears at the top of the messaging application, as shown in FIG. 11M. Search results after entry of a search term are shown in FIG. 11N.

Figure 11R:
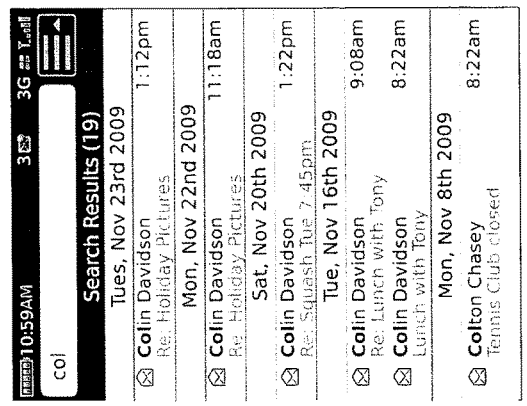
Figure 11Q:
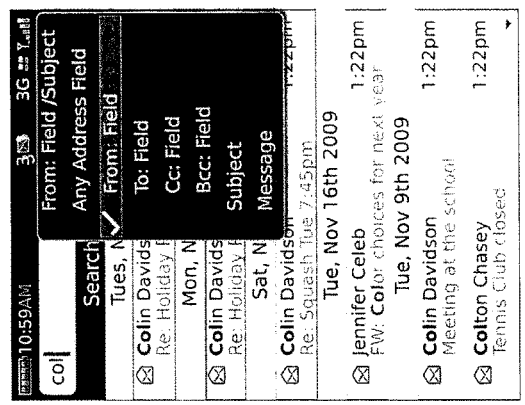
Figure 11P:
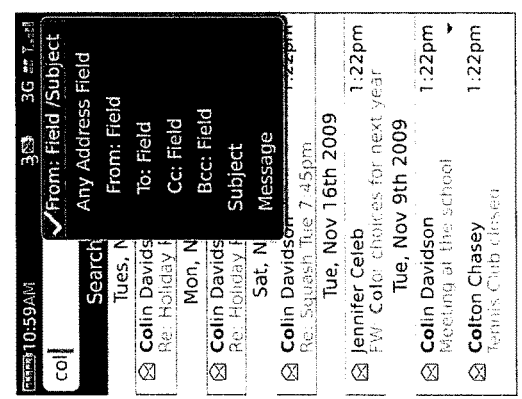
Figure 11O:
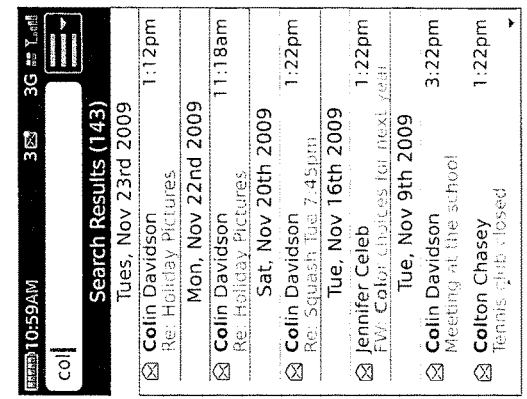

In the top right corner of the search results screen is a focus option, as shown in FIG. 11O. The focus option has been selected, as shown in FIG. 11P. It allows adjustment of the fields of data in the search results that are searched. For example, in FIG. 11Q, the From field is being selected. FIG. 11R displays the search results after selecting the From field.

Figure 11U:
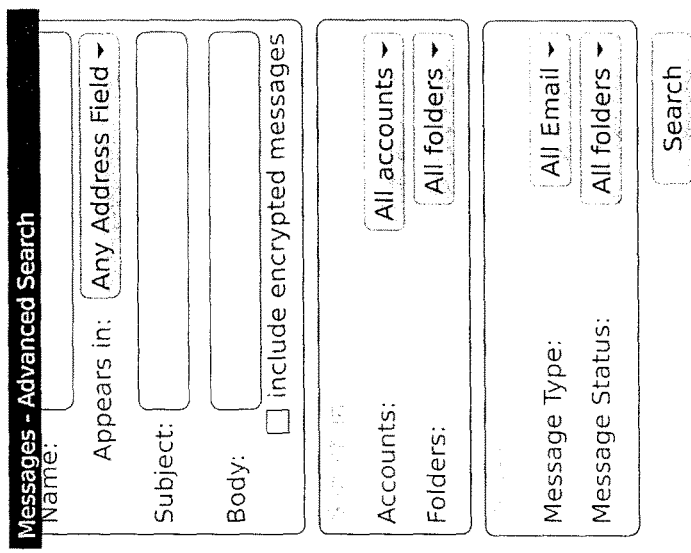
Figure 11T:
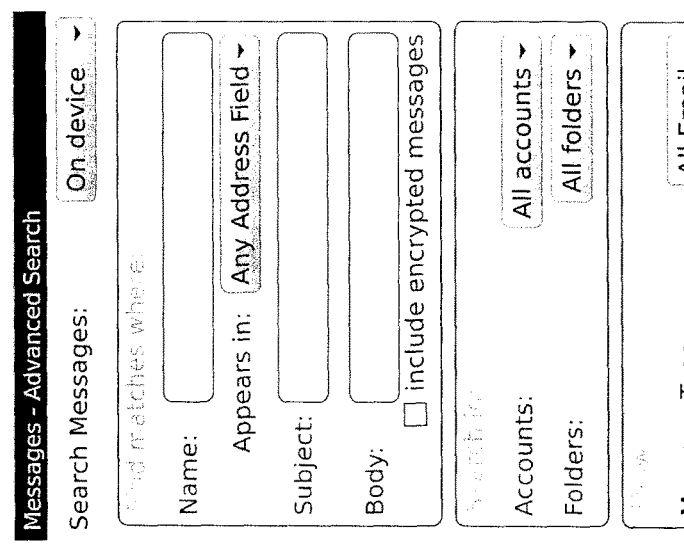
Figure 11S:
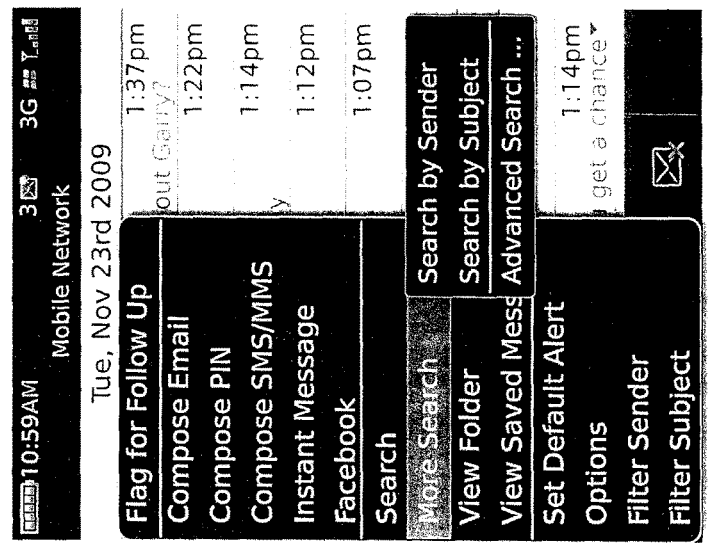

As explained earlier, a menu including a search option may be called from within the messaging application. This is shown in FIG. 11S. Here, there is also an advanced search option, which allows further narrowing of the search results, sc shown in FIGS. 11T and 11U.

Figures 11V, 11W, 11X, 11Y:
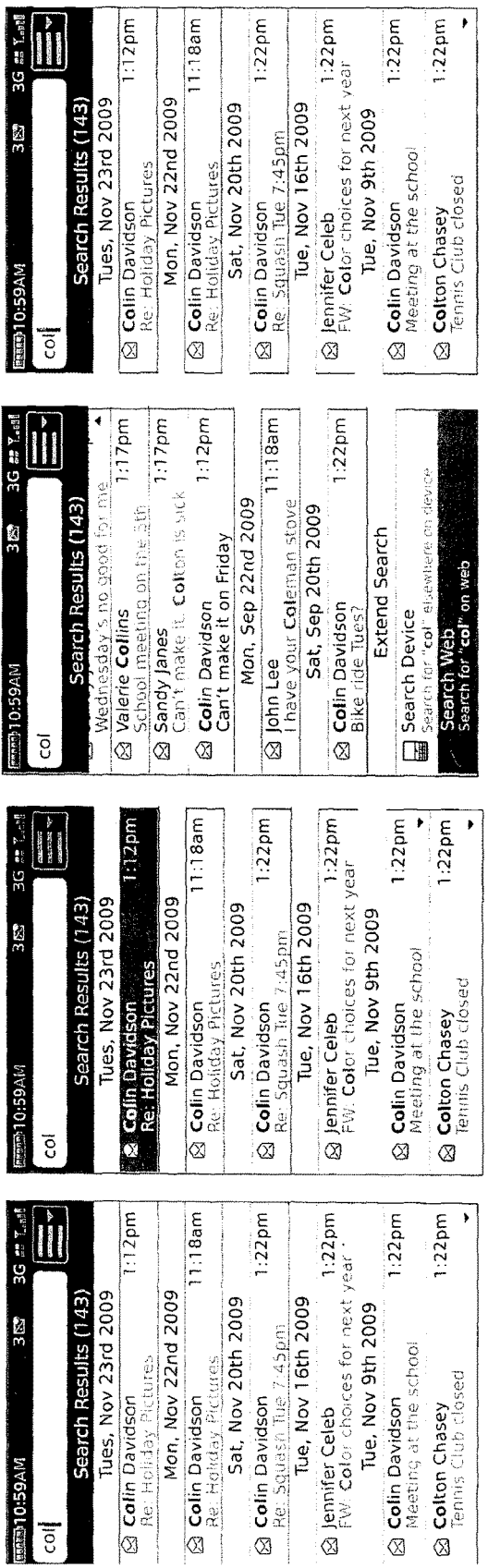

When the focus is the search bar, keystrokes are entered into the search bar and become part of the search term, as shown in FIG. 11V. However, when the focus is changed to the search results, such as in FIG. 11W, keystrokes are interpreted as shortcut commands. For example, the last entry in the search results list is shown in FIG. 11X, because the "B" key has been pressed. In FIG. 11Y, the focus has returned to the search bar, because the "S" key has been pressed.

Figure 12C:
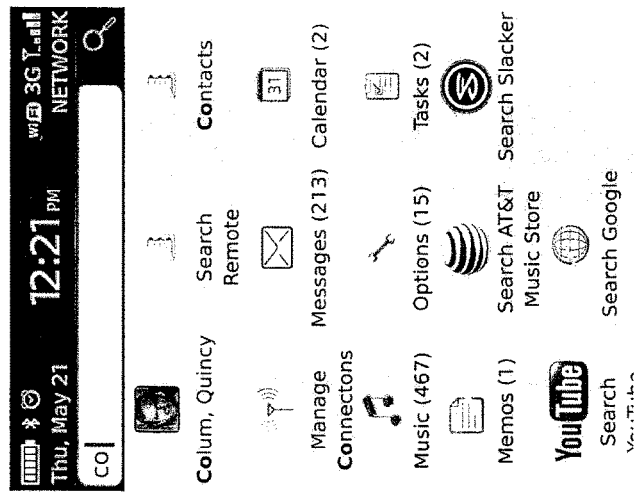
FIGS. 12A-12L illustrate a mobile wireless communications device, such as those of FIGS. 1, 2, and 4, performing a comprehensive search, in accordance with the present disclosure.
Figure 12B:
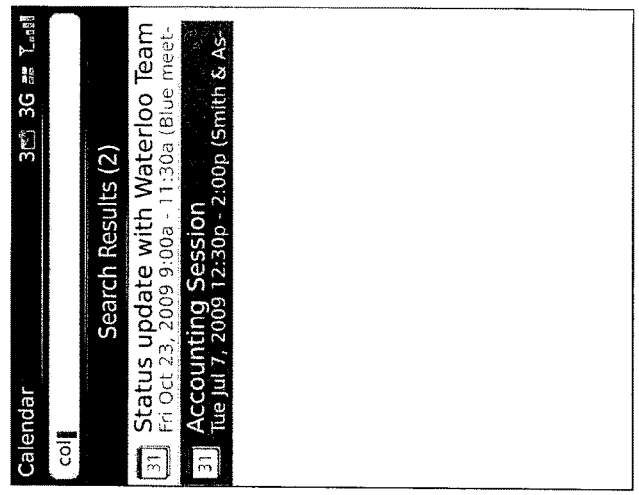
Figure 12A:
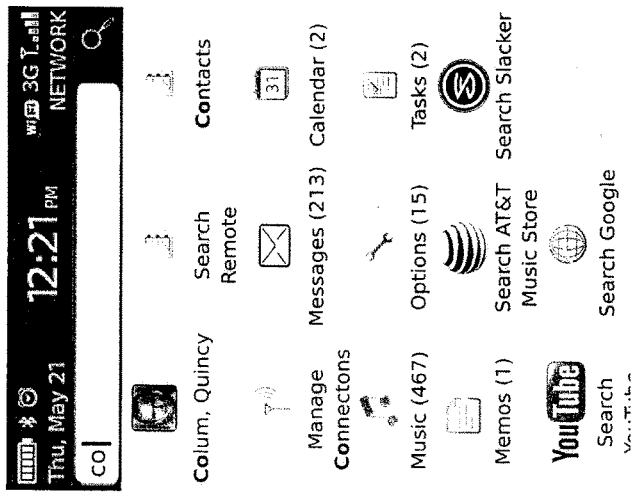

Shown in FIG. 12A are search results, including search results from the calendar application. Selecting the calendar icon from the search results launches the calendar application, which then displays the search results, as shown in FIG. 12B. Pressing the escape key returns to the original search results screen, as shown in FIG. 12C.

Figure 12F:
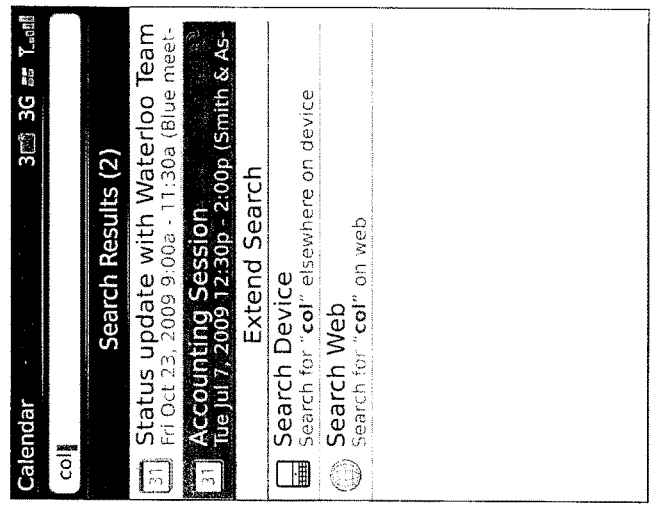
Figure 12E:
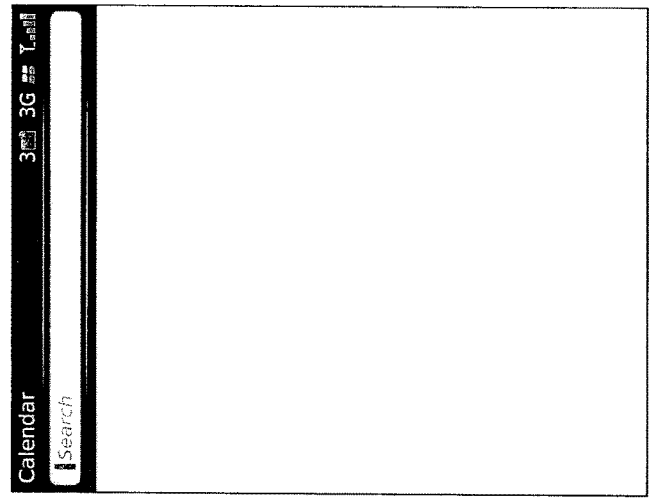
Figure 12D:
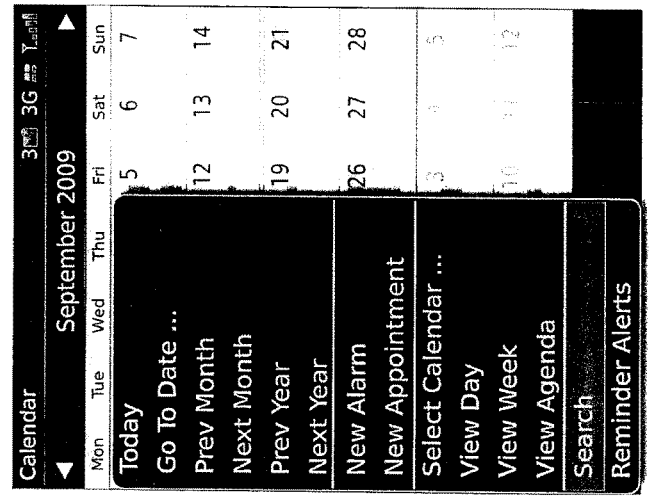
Figure 12I:
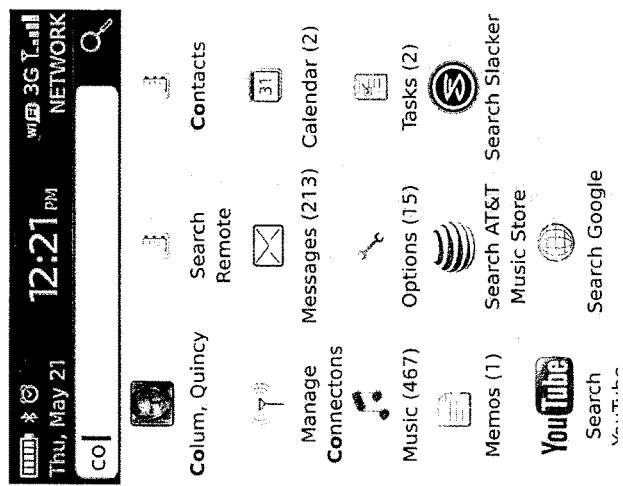
Figure 12H:
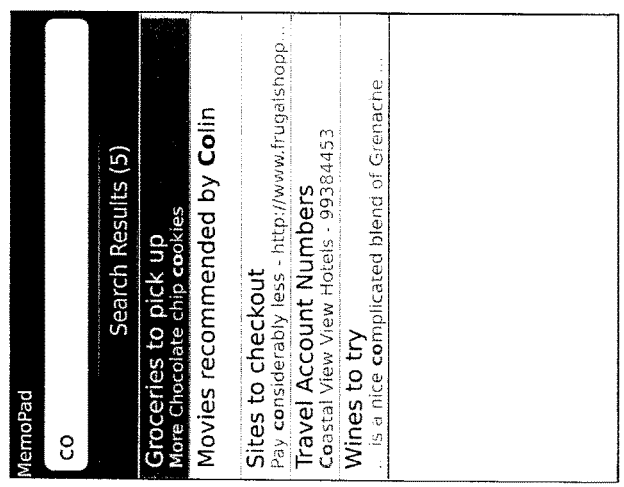
Figure 12G:
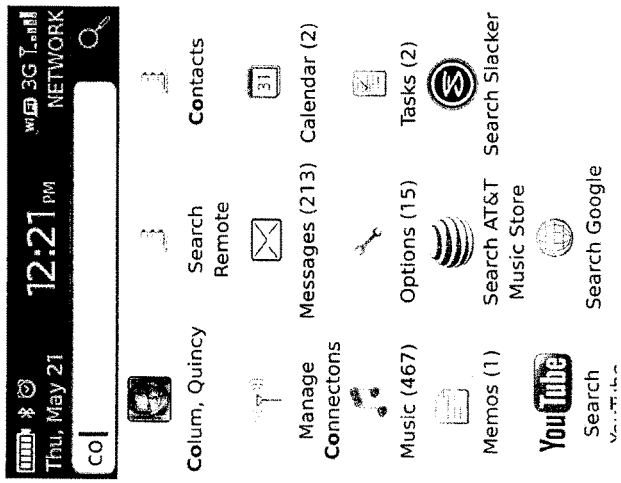
Figure 12L:
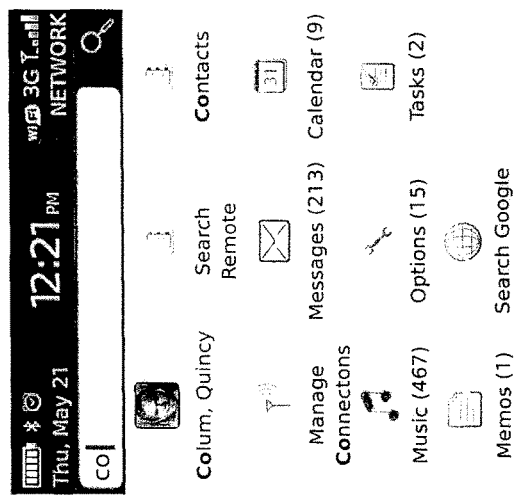
Figure 12K:
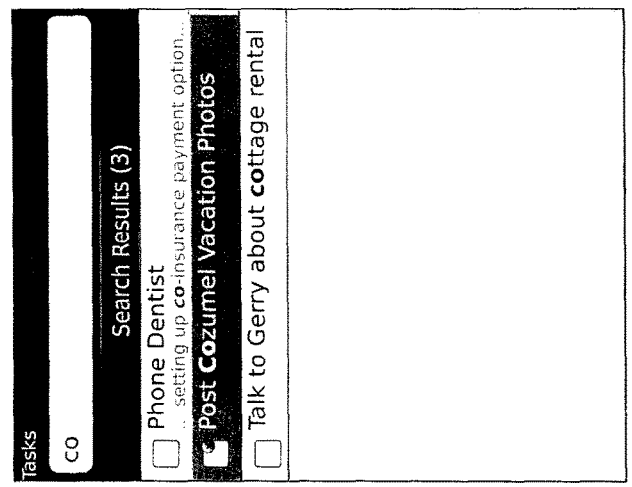
Figure 12J:
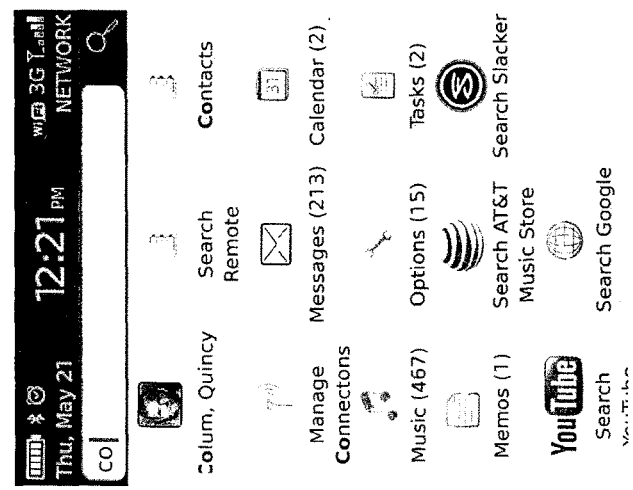

The comprehensive search may be launched from within any application, for example the calendar application, as shown in FIGS. 12D-12F, the memo application, as shown in FIGS. 12G-12I, and the tasks application, as shown in FIGS. 12J-12L.

The embodiments described herein generally relate to a mobile wireless communication device, hereafter referred to as a mobile device, which can be configured according to an IT policy. It should be noted that the term IT policy, in general, refers to a collection of IT policy rules, in which the IT policy rules can be defined as being either grouped or non-grouped and global or per-user. The terms grouped, non-grouped, global and per-user are defined further below. Examples of applicable communication devices include pagers, cellular phones, cellular smart-phones, wireless organizers, personal digital assistants, computers, laptops, handheld wireless communication devices, wirelessly enabled notebook computers and the like.

The mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities). To aid the reader in understanding the structure of the mobile device and how it communicates with other devices and host systems, reference will now be made to FIGS. 4 through 7.

Referring first to FIG. 4, shown therein is a block diagram of a mobile device 100 which can be used to implement example embodiments disclosed herein. The mobile device 100 includes a number of components such as a main processor 102 that controls the overall operation of the mobile device 100. Communication functions, including data and voice communications, are performed through a communication subsystem 104. The communication subsystem 104 receives messages from and sends messages to a wireless network 200. In this example embodiment of the mobile device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with mobile device 100 is a GSM/GPRS wireless network in one example implementation, other wireless networks may also be associated with the mobile device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 requires a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 can include some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, user identification information can also be programmed into the flash memory 108.

The mobile device 100 is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, will normally be installed on the mobile device 100 during its manufacture. Other software applications include a message application 138 that can be any suitable software program that allows a user of the mobile device 100 to send and receive electronic messages. Various alternatives exist for the message application 138 as is well known to those skilled in the art. Messages that have been sent or received by the user are typically stored in the flash memory 108 of the mobile device 100 or some other suitable storage element in the mobile device 100. In at least some embodiments, some of the sent and received messages may be stored remotely from the device 100 such as in a data store of an associated host system that the mobile device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

The mobile device 100 also includes a connect module 144, and an IT policy module 146. The connect module 144 implements the communication protocols that are required for the mobile device 100 to communicate with the wireless infrastructure and any host system, such as an enterprise system, that the mobile device 100 is authorized to interface with. Examples of a wireless infrastructure and an enterprise system are given in FIGS. 3 and 4, which are described in more detail below.

The connect module 144 includes a set of APIs that can be integrated with the mobile device 100 to allow the mobile device 100 to use any number of services associated with the enterprise system. The connect module 144 allows the mobile device 100 to establish an end-to-end secure, authenticated communication pipe with the host system. A subset of applications for which access is provided by the connect module 144 can be used to pass IT policy commands from the host system to the mobile device 100. This can be done in a wireless or wired manner. These instructions can then be passed to the IT policy module 146 to modify the configuration of the device 100. Alternatively, in some cases, the IT policy update can also be done over a wired connection.

The IT policy module 146 receives IT policy data that encodes the IT policy. The IT policy module 146 then ensures that the IT policy data is authenticated by the mobile device 100. The IT policy data can then be stored in the flash memory 106 in its native form. After the IT policy data is stored, a global notification can be sent by the IT policy module 146 to all of the applications residing on the mobile device 100. Applications for which the IT policy may be applicable then respond by reading the IT policy data to look for IT policy rules that are applicable.

The IT policy module 146 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some embodiments, the IT policy module 146 can determine which applications are affected by the IT policy data and send a notification to only those applications. In either of these cases, for applications that aren't running at the time of the notification, the applications can call the parser or the IT policy module 146 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 146 sends an acknowledgement back to the host system to indicate that the IT policy data was received and successfully applied.

Other types of software applications can also be installed on the mobile device 100. These software applications can be third party applications, which are added after the manufacture of the mobile device 100. Examples of third party applications include games, calculators, utilities, etc.

The additional applications can be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and may provide enhanced on-device functions, communication-related functions, or both. For example, secure communication applications may enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

The short-range communications subsystem 122 provides for communication between the mobile device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the mobile device 100 is substantially similar, except that the received signals are output to the speaker 118, and signals for transmission are generated by the microphone 120.

Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Figure 5:
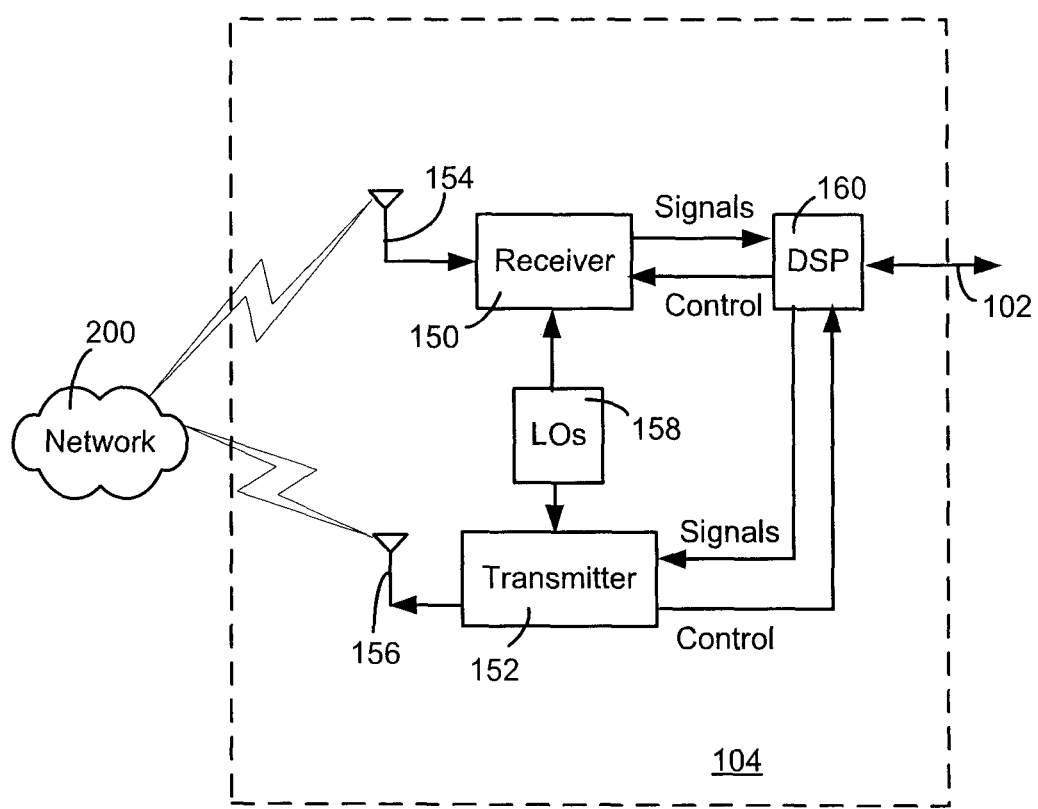
FIG. 5 is a block diagram of an example embodiment of a communication subsystem component of the mobile device of FIG. 4.

Referring now to FIG. 5, an example block diagram of the communication subsystem component 104 is shown. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the mobile device 100 is intended to operate. Thus, it should be understood that the design illustrated in FIG. 2 serves only as one example.

Signals received by the antenna 154 through the wireless network 200 are input to the receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 may be adaptively controlled through automatic gain control algorithms implemented in the DSP 160.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100.

When the mobile device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

Figure 6:
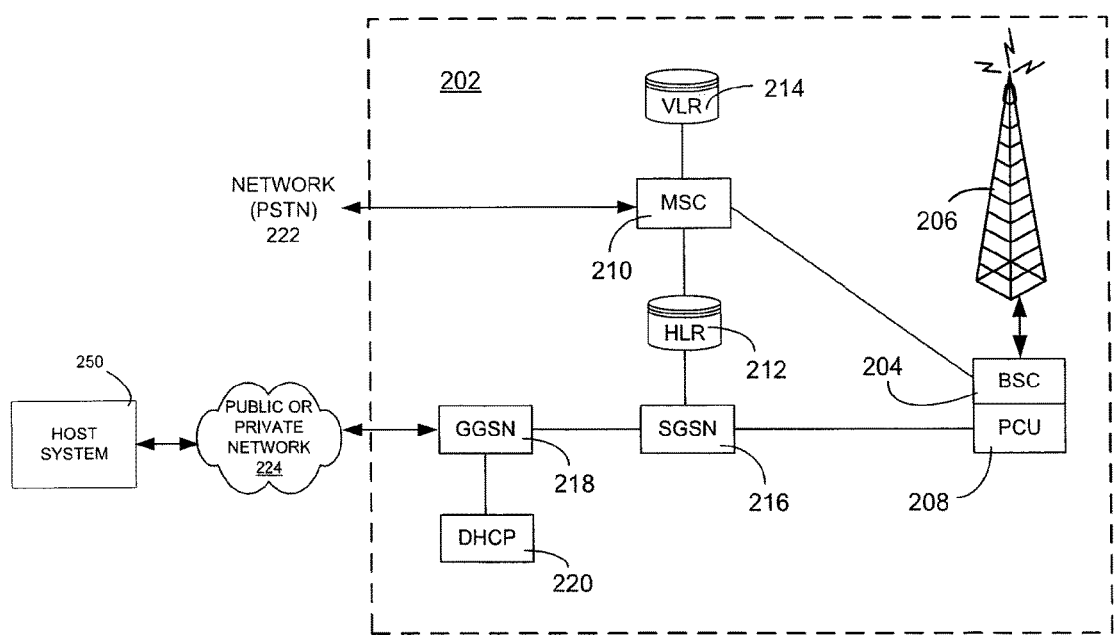
FIG. 6 is an example block diagram of a node of a wireless network, such as may be used with the embodiments disclosed herein.

Referring now to FIG. 6, a block diagram of an example implementation of a node 202 of the wireless network 200 is shown. In practice, the wireless network 200 comprises one or more nodes 202. In conjunction with the connect module 144, the mobile device 100 can communicate with the node 202 within the wireless network 200. In the example implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable mobile devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the mobile device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from the mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support; namely packet switched data support, within GSM. The SGSN 216 and the MSC 210 have similar responsibilities within the wireless network 200 by keeping track of the location of each mobile device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a mobile device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a mobile device 100 is not using its PDP Context, the PDP Context can be de-allocated and the IP address returned to the IP address pool managed by the DHCP server 220.

Figure 7:
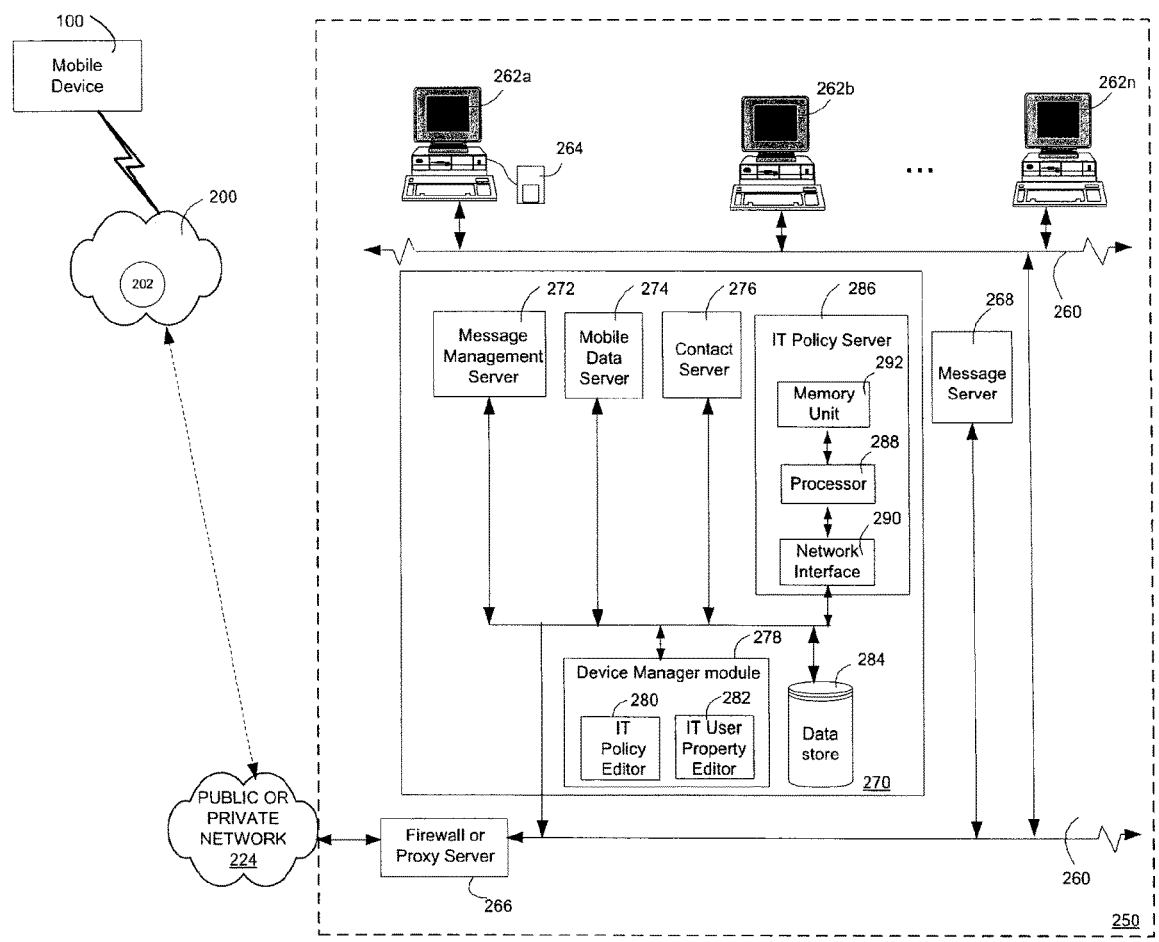
FIG. 7 is a block diagram illustrating components of a host system in one example configuration for use with the wireless network of FIG. 6 and the mobile device of FIG. 4.

Referring now to FIG. 7, shown therein is a block diagram illustrating components of an example configuration of a host system 250 that the mobile device 100 can communicate with in conjunction with the connect module 144. The host system 250 will typically be a corporate enterprise or other local area network (LAN), but may also be a home office computer or some other private system, for example, in variant implementations. In this example shown in FIG. 4, the host system 250 is depicted as a LAN of an organization to which a user of the mobile device 100 belongs. Typically, a plurality of mobile devices can communicate wirelessly with the host system 250 through one or more nodes 202 of the wireless network 200.

The host system 250 comprises a number of network components connected to each other by a network 260. For instance, a user's desktop computer 262*a* with an accompanying cradle 264 for the user's mobile device 100 is situated on a LAN connection. The cradle 264 for the mobile device 100 can be coupled to the computer 262*a* by a serial or a Universal Serial Bus (USB) connection, for example. Other user computers 262*b*-262*n* are also situated on the network 260, and each may or may not be equipped with an accompanying cradle 264. The cradle 264 facilitates the loading of information (e.g. PIM data, private symmetric encryption keys to facilitate secure communications) from the user computer 262*a* to the mobile device 100, and may be particularly useful for bulk information updates often performed in initializing the mobile device 100 for use. The information downloaded to the mobile device 100 may include certificates used in the exchange of messages.

It will be understood by persons skilled in the art that the user computers 262*a*-262*n* will typically also be connected to other peripheral devices, such as printers, etc. which are not explicitly shown in FIG. 4. Furthermore, only a subset of network components of the host system 250 are shown in FIG. 4 for ease of exposition, and it will be understood by persons skilled in the art that the host system 250 will comprise additional components that are not explicitly shown in FIG. 4 for this example configuration. More generally, the host system 250 may represent a smaller part of a larger network (not shown) of the organization, and may comprise different components and/or be arranged in different topologies than that shown in the example embodiment of FIG. 7.

To facilitate the operation of the mobile device 100 and the wireless communication of messages and message-related data between the mobile device 100 and components of the host system 250, a number of wireless communication support components 270 can be provided. In some implementations, the wireless communication support components 270 can include a message management server 272, a mobile data server 274, a contact server 276, and a device manager module 278. The device manager module 278 includes an IT Policy editor 280 and an IT user property editor 282, as well as other software components for allowing an IT administrator to configure the mobile devices 100. In an alternative embodiment, there may be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the mobile devices 100. The memory unit 292 can store functions used in implementing the IT policy as well as related data. Those skilled in the art know how to implement these various components. Other components may also be included as is well known to those skilled in the art. Further, in some implementations, the data store 284 can be part of any one of the servers.

In this example embodiment, the mobile device 100 communicates with the host system 250 through node 202 of the wireless network 200 and a shared network infrastructure 224 such as a service provider network or the public Internet. Access to the host system 250 may be provided through one or more routers (not shown), and computing devices of the host system 250 may operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the mobile device 100. The wireless VPN router allows a VPN connection to be established directly through a specific wireless network to the mobile device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the mobile device 100 in this alternative implementation.

Messages intended for a user of the mobile device 100 are initially received by a message server 268 of the host system 250. Such messages may originate from any number of sources. For instance, a message may have been sent by a sender from the computer 262b within the host system 250, from a different mobile device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some example implementations of the message server 268 include a Microsoft ExchangeÔ server, a Lotus Domino™ server, a Novell Groupwise™ server, or another suitable mail server installed in a corporate environment. In some implementations, the host system 250 may comprise multiple message servers 268. The message server 268 may also be adapted to provide additional functions beyond message management, including the management of data associated with calendars and task lists, for example.

When messages are received by the message server 268, they are typically stored in a data store associated with the message server 268. In at least some embodiments, the data store may be a separate hardware unit, such as data store 284, that the message server 268 communicates with. Messages can be subsequently retrieved and delivered to users by accessing the message server 268. For instance, an e-mail client application operating on a user's computer 262a may request the e-mail messages associated with that user's account stored on the data store associated with the message server 268. These messages are then retrieved from the data store and stored locally on the computer 262a. The data store associated with the message server 268 can store copies of each message that is locally stored on the mobile device 100. Alternatively, the data store associated with the message server 268 can store all of the messages for the user of the mobile device 100 and only a smaller number of messages can be stored on the mobile device 100 to conserve memory. For instance, the most recent messages (i.e. those received in the past two to three months for example) can be stored on the mobile device 100.

When operating the mobile device 100, the user may wish to have e-mail messages retrieved for delivery to the mobile device 100. The message application 138 operating on the mobile device 100 may also request messages associated with the user's account from the message server 268. The message application 138 may be configured (either by the user or by an administrator, possibly in accordance with an organization's information technology (IT) policy) to make this request at the direction of the user, at some pre-defined time interval, or upon the occurrence of some pre-defined event. In some implementations, the mobile device 100 is assigned its own e-mail address, and messages addressed specifically to the mobile device 100 are automatically redirected to the mobile device 100 as they are received by the message server 268.

The message management server 272 can be used to specifically provide support for the management of messages, such as e-mail messages, that are to be handled by mobile devices. Generally, while messages are still stored on the message server 268, the message management server 272 can be used to control when, if, and how messages are sent to the mobile device 100. The message management server 272 also facilitates the handling of messages composed on the mobile device 100, which are sent to the message server 268 for subsequent delivery.

For example, the message management server 272 may monitor the user's "mailbox" (e.g. the message store associated with the user's account on the message server 268) for new e-mail messages, and apply user-definable filters to new messages to determine if and how the messages are relayed to the user's mobile device 100. The message management server 272 may also compress and encrypt new messages (e.g. using an encryption technique such as Data Encryption Standard (DES), Triple DES, or Advanced Encryption Standard (AES)) and push them to the mobile device 100 via the shared network infrastructure 224 and the wireless network 200. The message management server 272 may also receive messages composed on the mobile device 100 (e.g. encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the mobile device 100 can be defined (e.g. by an administrator in accordance with IT policy) and enforced by the message management server 272. These may include whether the mobile device 100 may receive encrypted and/or signed messages, minimum encryption key sizes, whether outgoing messages must be encrypted and/or signed, and whether copies of all secure messages sent from the mobile device 100 are to be sent to a pre-defined copy address, for example.

The message management server 272 may also be adapted to provide other control functions, such as only pushing certain message information or pre-defined portions (e.g. "blocks") of a message stored on the message server 268 to the mobile device 100. For example, in some cases, when a message is initially retrieved by the mobile device 100 from the message server 268, the message management server 272 may push only the first part of a message to the mobile device 100, with the part being of a pre-defined size (e.g. 2 KB). The user can then request that more of the message be delivered in similar-sized blocks by the message management server 272 to the mobile device 100, possibly up to a maximum pre-defined message size. Accordingly, the message management server 272 facilitates better control over the type of data and the amount of data that is communicated to the mobile device 100, and can help to minimize potential waste of bandwidth or other resources.

The mobile data server 274 encompasses any other server that stores information that is relevant to the corporation. The mobile data server 274 may include, but is not limited to, databases, online data document repositories, customer relationship management (CRM) systems, or enterprise resource planning (ERP) applications.

The contact server 276 can provide information for a list of contacts for the user in a similar fashion as the address book on the mobile device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the message management server 272, the mobile data server 274, the contact server 276, the device manager module 278, the data store 284 and the IT policy server 286 do not need to be implemented on separate physical servers within the host system 250. For example, some or all of the functions associated with the message management server 272 may be integrated with the message server 268, or some other server in the host system 250. Alternatively, the host system 250 may comprise multiple message management servers 272, particularly in variant implementations where a large number of mobile devices need to be supported.

Alternatively, in some embodiments, the IT policy server 286 can provide the IT policy editor 280, the IT user property editor 282 and the data store 284. In some cases, the IT policy server 286 can also provide the device manager module 278. The processor 288 of the IT policy server 286 can be used to perform the various steps of a method for providing IT policy data that is customizable on a per-user basis as explained further below and in conjunction with FIGS. 5 to 8. The processor 288 can execute the editors 280 and 282. In some cases, the functionality of the editors 280 and 282 can be provided by a single editor. In some cases, the memory unit 292 can provide the data store 284.

The device manager module 278 provides an IT administrator with a graphical user interface with which the IT administrator interacts to configure various settings for the mobile devices 100. As mentioned, the IT administrator can use IT policy rules to define behaviors of certain applications on the mobile device 100 that are permitted such as phone, web browser or Instant Messenger use. The IT policy rules can also be used to set specific values for configuration settings that an organization requires on the mobile devices 100 such as auto signature text, WLAN/VoIP/VPN configuration, security requirements (e.g. encryption algorithms, password rules, etc.), specifying themes or applications that are allowed to run on the mobile device 100, and the like.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A mobile wireless communications device comprising:
   a display;
   a memory configured to store a plurality of applications and corresponding application data for each application;
   at least one input device; and
   a processor configured to:
      present a search bar on the display based upon an input received from the at least one input device and receive entry of a search term into the search bar via the at least one input device;
      search the application data for the search term to thereby determine whether each application of the plurality thereof has search results associated therewith,
      present applications having search results associated therewith on an application selection screen, displaying a subset of information about the search results, on the display,
      receive selection of an application of the plurality thereof via the at least one input device and suspend search of the application data for the search term in response to receiving the selection;
      execute the selected application to thereby present, on the display, the search bar containing the entered search term and first search results that are associated only with the selected application, wherein the processor, when executing the selected application, is configured to:
         receive a modification of the search term in the displayed search bar;
         search the application data corresponding to the selected application for the modified search term to thereby refine the first search results in generating modified search results;
         present, on the display, the modified search results within a user interface of the selected application and the search bar containing the modified search term;
         receive an instruction, via the at least one input device, to exit from the selected application; and
         in response to receiving the instruction, exit from the selected application and re-display the application selection screen and resume the search of the application data for the search term, wherein the re-displayed application selection screen presents search results which were displayed immediately prior to suspension of the search of the application data for the search term.

2. The mobile wireless communications device of claim 1, wherein the processor is configured to present the applications having search results associated therewith on the display by presenting respective icons representing the applications on the display, and by presenting an indication of a quantity of search results for each icon adjacent thereto.

3. The mobile wireless communications device of claim 2, wherein the processor is configured to present the indication of the quantity of search results as a number.

4. The mobile wireless communications device of claim 1, wherein the application data comprises application icons and labels associated therewith.

5. The mobile wireless communications device of claim 1, wherein the processor is also configured to present a web search icon with the search results, and to search at least one associated web site for the search term based upon selection of the web search icon.

6. The mobile wireless communications device of claim 1, wherein the memory is also configured to store an Internet enabled application having application data associated therewith stored on an external server; wherein the processor is also configured to present an icon for the Internet enabled application with the search results; and wherein the processor is configured to search the external server for the search teini via execution of the Internet enabled application, based upon selection of the icon for the Internet enabled application.

7. The mobile wireless communications device of claim 6, wherein the Internet enabled application comprises a music streaming application.

8. The mobile wireless communications device of claim 6, wherein the Internet enabled application comprises a social networking application.

9. A method of searching application data using a mobile wireless communications device, the mobile wireless communications device including a display, a memory, at least one input device, and a processor coupled to the display, the memory, and the at least one input device, the method comprising:
  presenting a search bar on the display based upon an input received from the at least one input device and receiving entry of a search term into the search bar via the at least one input device;
  storing a plurality of applications and corresponding application data for each application in the memory of the mobile wireless communication device;
  searching the application data for the search term to thereby determine whether each application of the plurality thereof has search results associated therewith, using the processor of the mobile wireless communications device;
  presenting applications having search results associated therewith on an application selection screen, displaying a subset of information about the search results, on the display of the mobile wireless communications device, using the processor;
  receiving selection of an application of the plurality thereof via the at least one input device of the mobile wireless communications device and suspending search of the application data for the search term in response to receiving the selection, using the processor; and
  executing the selected application to thereby present, on the display, the search bar containing the entered search term and first search results that are associated only with the selected application, using the processor,
wherein executing the selected application includes:
  receiving a modification of the search term in the displayed search bar;
  searching the application data corresponding to the selected application for the modified search term to thereby refine the first search results in generating modified search results;
  presenting, on the display, the modified search results within a user interface of the selected application and the search bar containing the modified search term;
  receiving an instruction, via the at least one input device, to exit from the selected application; and
  in response to receiving the instruction, exiting from the selected application and re-displaying the application selection screen and resuming the search of the application data for the search term, wherein the re-displayed application selection screen presents search results which were displayed immediately prior to suspension of the search of the application data for the search term.

10. The method of claim 9, wherein the applications having search results associated therewith are presented on the display by presenting respective icons representing the applications on the display, and by presenting an indication of a quantity of search results for each icon adjacent thereto, using the processor.

11. The method of claim 9, further comprising presenting a web search icon with the search results, and searching at least one associated web site for the search term based upon selection of the web search icon, using the processor.

12. The method of claim 9, further comprising storing, in the memory, an Internet enabled application having application data associated therewith stored on an external server; further comprising presenting an icon for the Internet enabled application with the search results, using the processor; and further comprising searching the external server for the search term via execution of the Internet enabled application, based upon selection of the icon for the Internet enabled application, using the processor.

13. The mobile wireless communications device of claim 1, wherein the search bar is displayed at a fixed first location during both of presentation of the application selection screen and execution of the selected application.

14. The method of claim 9, wherein the search bar is displayed at a fixed first location during both of presentation of the application selection screen and execution of the selected application.

15. The mobile wireless communications device of claim 1, wherein the instruction comprises an input on a keyboard associated with the device.

16. The method of claim 9, wherein the instruction comprises an input on a keyboard associated with the device.

* * * * *